United States Patent
Zirwas et al.

(10) Patent No.: US 12,501,286 B2
(45) Date of Patent: Dec. 16, 2025

(54) DEVICES, METHODS AND APPARATUSES FOR CHANNEL PREDICTION

(71) Applicant: Nokia Technologies Oy, Espoo (FI)

(72) Inventors: Wolfgang Zirwas, Munich (DE); Brenda Vilas Boas, Munich (DE)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 18/472,004

(22) Filed: Sep. 21, 2023

(65) Prior Publication Data

US 2024/0129756 A1    Apr. 18, 2024

(30) Foreign Application Priority Data

Sep. 30, 2022 (GB) .................................. 2214406

(51) Int. Cl.
    *H04W 24/02*      (2009.01)
    *H04W 24/08*      (2009.01)

(52) U.S. Cl.
    CPC ........... *H04W 24/02* (2013.01); *H04W 24/08* (2013.01)

(58) Field of Classification Search
    CPC ..... H04W 24/02; H04W 24/08; H04W 16/22; G06N 3/0442; G06N 3/0464; G06N 3/096; G06N 3/045; G06N 3/09; H04B 17/373; H04B 17/3913; H04L 25/0224; H04L 25/0254
See application file for complete search history.

(56) References Cited

U.S. PATENT DOCUMENTS

| | | |
|---|---|---|
| 10,652,782 B1 | 5/2020 | Korpi et al. |
| 11,329,737 B1 | 5/2022 | Khafizov et al. |
| 2015/0161662 A1* | 6/2015 | Minor ............... G06Q 30/0275 705/14.48 |
| 2019/0311259 A1* | 10/2019 | Cricri ....................... G06N 3/08 |
| 2022/0007198 A1 | 1/2022 | Mahalingam et al. |
| 2023/0196072 A1* | 6/2023 | Zou ...................... G06N 3/0495 706/22 |

(Continued)

FOREIGN PATENT DOCUMENTS

| | | |
|---|---|---|
| CN | 111901024 B | 11/2021 |
| WO | 2022/186659 A1 | 9/2022 |
| WO | 2023/018607 A1 | 2/2023 |

OTHER PUBLICATIONS

Extended European Search Report received for corresponding European Patent Application No. 23199930.1, dated Feb. 20, 2024, 8 pages.

(Continued)

*Primary Examiner* — Michael A Keller
(74) *Attorney, Agent, or Firm* — Lippes Mathias LLP

(57) ABSTRACT

Embodiments of the present disclosure disclose devices, methods and apparatuses for channel prediction. A terminal device obtains model configuration information. The model configuration information indicates a first prediction model for channel prediction. The terminal device receives overfitting configuration information from a network device. The overfitting configuration information indicates configuration on reference signals for overfitting by the first prediction model. The terminal device reports channel information predicted based on the first prediction model and the overfitting configuration information.

20 Claims, 14 Drawing Sheets

(56) References Cited

U.S. PATENT DOCUMENTS

2025/0286601 A1* 9/2025 Zhang .................. H04W 16/28

OTHER PUBLICATIONS

"Summary#3 for CSI evaluation of [110-R18-AI/ML]", 3GPP TSG-RAN WG1 Meeting #110, R1-2207838, Agenda: 9.2.2.1, Huawei, Aug. 22-26, 2022, 135 pages.

"Discussion on general aspects of AI/ML framework", 3GPP TSG-RAN WG1 Meeting #110, Tdoc R1-2206885, Agenda: 9.2.1, Ericsson, Aug. 22-26, 2022, pp. 1-27.

"Summary#1 of [109-e-R18-AI/ML-03]", 3GPP TSG RAN WG1 Meeting #109-e, R1-2205222, Agenda: 9.2.2.1, Huawei, May 9-20, 2022, 88 pages.

Ahrens et al., "Convolutional-Type Neural Networks for Fading Channel Forecasting", IEEE Access, vol. 8, Oct. 22, 2020, pp. 193075-193090.

Wang et al., "Generalizing from a Few Examples: A Survey on Few-Shot Learning", arXiv, Mar. 29, 2020, pp. 1-34.

Koch et al., "Siamese Neural Networks for One-shot Image Recognition", Proceedings of the 32 nd International Conference on Machine Learning, vol. 37, 2015, 8 pages.

"Msc-generator", Sourceforge, Retrieved on Oct. 19, 2023, Webpage available at : https://sourceforge.net/projects/msc-generator/.

"3rd Generation Partnership Project; Technical Specification Group Radio Access Network; NR; Physical layer procedures for data (Release 17)", 3GPP TS 38.214, V17.2.0, Jun. 2022, pp. 1-228.

"IEEE 802.11", Wikipedia, Retrieved on Oct. 3, 2023, Webpage available at : https://en.wikipedia.org/wiki/IEEE_802.11.

Combined Search and Examination Report received for corresponding United Kingdom Patent Application No. 2214406.7, dated Mar. 31, 2023, 4 pages.

"Other aspects on AI/ML for CSI feedback enhancement", 3GPP TSG RAN WG1 #110bis-e, R1-2209368, Agenda: 9.2.2.2, Nokia, Oct. 10-19, 2022, 19 pages.

* cited by examiner

DEVICES, METHODS AND APPARATUSES
FOR CHANNEL PREDICTION

CROSS REFERENCE TO RELATED APPLICATION

This application claims the benefit of GB application No. 2214406.7 filed on Sep. 30, 2022, which is incorporated herein by reference in its entirety.

FIELD

Embodiments of the present disclosure generally relate to the field of communication, and in particular, to devices, methods, apparatuses and computer readable storage medium for channel prediction.

BACKGROUND

With the development of communication technology, channel prediction has been introduced to improve the performance of communications between a terminal device and a network device. For example, channel state information (CSI) obtained from the channel prediction can improve the precoding performance of Multi-User Multiple-Input Multiple-Output (MU MIMO) systems. Therefore, it may enhance terminal device throughput and reduce feedback since the channel reporting rate may be reduced in case of a large prediction horizon. Therefore, communication performance may be improved.

The artificial intelligence (AI) or machine learning (ML) model was proposed to be employed in various communication systems recently. Appropriate utilization of the AI or ML model in the channel prediction (e.g., channel information prediction) is also desirable for enhanced performance, reduced complexity and/or decreased overhead.

SUMMARY

In general, example embodiments of the present disclosure provide devices, methods, apparatuses and computer readable storage medium for channel information prediction.

In a first aspect, there is provided a terminal device. The terminal device may comprise one or more transceivers; and one or more processors communicatively coupled to the one or more transceivers, and the one or more processors are configured to cause the terminal device to: obtain model configuration information, wherein the model configuration information indicates a first prediction model for channel prediction; receive overfitting configuration information from the network device, wherein the overfitting configuration information indicates configuration on reference signals for overfitting the first prediction model; and report, to the network device, channel information predicted based on the first prediction model and the overfitting configuration information.

In a second aspect, there is provided a network device. The network device may comprise one or more transceivers; and one or more processors communicatively coupled to the one or more transceivers, and the one or more processors are configured to cause the network device to: transmit overfitting configuration information to a terminal device, wherein the overfitting configuration information indicates configuration on reference signals for overfitting the first prediction model; and receive, from the terminal device, channel information predicted based on the first prediction model and the overfitting configuration information.

In a third aspect, there is provided a method implemented at a terminal device. The method may comprise: obtaining model configuration information, wherein the model configuration information indicates a first prediction model for channel prediction; receiving overfitting configuration information from a network device, wherein the overfitting configuration information indicates configuration on reference signals for overfitting the first prediction model; and reporting, to the network device, channel information predicted based on the first prediction model and the overfitting configuration information.

In a fourth aspect, there is provided a method implemented at a network device. The method may comprise: transmitting overfitting configuration information to a terminal device, wherein the overfitting configuration information indicates configuration on reference signals for overfitting the first prediction model; and receiving, from the terminal device, channel information predicted based on the first prediction model and the overfitting configuration information.

In a fifth aspect, there is provided an apparatus of a terminal device. The apparatus may comprise: means for obtaining model configuration information, wherein the model configuration information indicates a first prediction model for channel prediction; means for receiving overfitting configuration information from a network device, wherein the overfitting configuration information indicates configuration on reference signals for overfitting the first prediction model; and means for reporting, to the network device, channel information predicted based on the first prediction model and the overfitting configuration information.

In a sixth aspect, there is provided an apparatus of a network device. The apparatus may comprise: means for transmitting overfitting configuration information to a terminal device, wherein the overfitting configuration information indicates configuration on reference signals for overfitting the first prediction model; and means for receiving, from the terminal device, channel information predicted based on the first prediction model and the overfitting configuration information.

In a seventh aspect, there is provided a terminal device. The terminal device may comprise at least one processor; and at least one memory including computer program codes, wherein the at least one memory and the computer program codes are configured to, with the at least one processor, cause the terminal device to: obtain model configuration information, wherein the model configuration information indicates a first prediction model for channel prediction; receive overfitting configuration information from a network device, wherein the overfitting configuration information indicates configuration on reference signals for overfitting the first prediction model; and report, to the network device, channel information predicted based on the first prediction model and the overfitting configuration information.

In an eighth aspect, there is provided a network device. The network device may comprise at least one processor; and at least one memory including computer program codes, wherein the at least one memory and the computer program codes are configured to, with the at least one processor, cause the network device to: transmit overfitting configuration information to a terminal device, wherein the overfitting configuration information indicates configuration on reference signals for overfitting the first prediction model; and receive, from the terminal device, channel information predicted based on the first prediction model and the overfitting configuration information.

In a ninth aspect, there is provided a non-transitory computer readable medium comprising program instructions for causing an apparatus to perform at least the method according to third or fourth aspect.

In a tenth aspect, there is provided a computer program comprising instructions, which, when executed by an apparatus, cause the apparatus at least to: obtain model configuration information, wherein the model configuration information indicates a first prediction model for channel prediction; receive overfitting configuration information from a network device, wherein the overfitting configuration information indicates configuration on reference signals for overfitting the first prediction model; and report, to the network device, channel information predicted based on the first prediction model and the overfitting configuration information.

In an eleventh aspect, there is provided a computer program comprising instructions, which, when executed by an apparatus, cause the apparatus at least to: transmit overfitting configuration information to a terminal device, wherein the overfitting configuration information indicates configuration on reference signals for overfitting the first prediction model; and receive, from the terminal device, channel information predicted based on the first prediction model and the overfitting configuration information.

In a twelfth aspect, there is provided a terminal device. The terminal device comprises: a first receiving circuitry, configured to obtain model configuration information, wherein the model configuration information indicates a first prediction model for channel prediction; a second receiving circuitry, configured to receive overfitting configuration information from a network device, wherein the overfitting configuration information indicates configuration on reference signals for overfitting the first prediction model; and a reporting circuitry, configured to report, to the network device, channel information predicted based on the first prediction model and the overfitting configuration information.

In a thirteenth aspect, there is provided a network device. The network device comprises: a transmitting circuitry, configured to transmit overfitting configuration information to a terminal device, wherein the overfitting configuration information indicates configuration on reference signals for overfitting the first prediction model; and a receiving circuitry, configured to receive, from the terminal device, channel information predicted based on the first prediction model and the overfitting configuration information.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
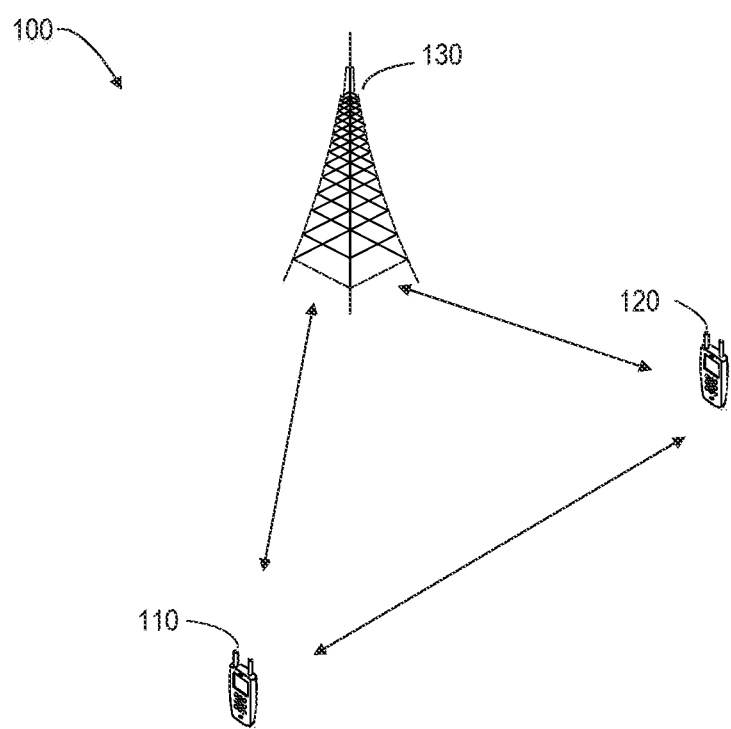
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which the present disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It may be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band Internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, and/or beyond. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, channel prediction or channel information prediction is beneficial for improving the performance of communication. The channel information may include channel state information (CSI) like precoding matrix indicator, channel quality information, rank indication, etc. In fact, any information related to a channel including, for example, explicit CSI can be referred to be "channel information".

The following description will be described with CSI as an example; however, this is only for illustrative purpose and it is not limited thereto. The protection scope of the present disclosure is not limited only to CSI prediction, and instead, the solution as proposed herein may be applied to any other information prediction, or, even applied to any other sub use cases like positioning, beam management, etc.

For further improving the communication performance between a terminal device and a network, an artificial intelligence (AI) or machine learning (ML) model (AI/ML model) may be employed to predict channel information. The AI/ML model may include any appropriate model, such as neural networks, and may be trained in various ways. Proper utilization of the AI or ML model in the above channel information prediction is desirable for enhanced performance, reduced complexity, decreased overhead.

Currently, channel information prediction is based on Kalman filters. However, Kalman filters are complex and require a relatively long on-line training time to obtain the best fitting Kalman filter parameters. In addition, the Kalman filters are specific to a terminal device, and have poor generalization property. Therefore, Kalman filters learn their state space model individually per a location of a terminal device by observing the radio channel over several of hundreds of milliseconds before being able to predict channel information. Therefore, channel information prediction based on Kalman filters has its drawbacks, and it is desirable to provide a more effective but less complex way to predict channel information.

According to embodiments of the present disclosure, a terminal device may obtain model configuration information. The model configuration information indicates a first prediction model for information prediction, for example, channel prediction. The terminal device further receives overfitting configuration information from a network device. The overfitting configuration information indicates configuration on reference signals for overfitting the first prediction model. The terminal device reports, to the network device, information for example, channel information, predicted based on the first prediction model and the overfitting configuration information.

As used herein, the term "overfitted" or overfitting may indicate a model that models the training data set too well and it is specialized but might have a bad generalization property, which means might not do well in the case of unseen data scenarios. "Overfitted" might happen when a model learns many details to the extent that it negatively impacts the performance of the model on new data.

The term "overfitted" or overfitting may indicate re-training of AI or ML model, wherein the retraining may be done in particularly for a single data set of a current channel evolution of a terminal device as estimated from a latest CSI reference signals (RSs).

The term "overfitting a prediction model" refers to perform the training or retraining to cause the prediction model overfitted. Usually, the model may be overfitted if the model is trained for a relatively long time on the training data.

Generally, overfitted or overfitting is considered to defeat the model's purpose. However, in the present disclosure, it is proposed to overfit the prediction modes at respective terminal devices to get performance gains.

In this way, the first prediction model may be efficiently overfitted or specialized for different terminal devices with different needs, for example if necessary, and the terminal device may predict the channel information in a more effective but less complex way. Thus, it ensures that potential overfitting gains are obtained and leveraged, while the overhead for the overfitting and the CSI is acceptable, or minimized, or even avoided in case the generalized model has a very high closeness value.

As mentioned above, in addition to channel prediction, the solution as proposed herein may be applied to other information prediction, or other sub use case, and in such a case the operations will be similar to those operations for channel prediction and only differences may lie in that the object to be predicted is different, for example including positioning information, beam information, etc., respectively for sub use cases of positioning, beam management, or other information; inputs to the prediction model might be different, including for example collected position information, beam measurement information, etc.; the data sets for training/re-training the prediction model are different, for example including those date sets respectively for positioning information, beam information, etc. However, the principle of the solution does not change substantially.

For illustrative purposes, principle and example embodiments of the present disclosure for the channel information prediction will be described below with reference to FIGS. 1-16. However, it is to be noted that these embodiments are given to enable the skilled in the art to understand inventive concepts of the present disclosure and implement the solution as proposed herein, and not intended to limit scope of the present application in any way.

FIG. 1 illustrates an example network environment 100 in which example embodiments of the present disclosure may be implemented. The environment 100, which may be a part of a communication network, includes terminal devices and network devices.

As illustrated in FIG. 1, the communication network 100 may include a terminal device 110, a terminal device 120, and a network 130. The terminal device 110 and the terminal device 120 may communicate with each other directly based on a sidelink transmission channel. The terminal device 110 and the terminal device 120 may also communication with each other via a network device 130. Moreover, the terminal device 110 may communicate with the network device 130 and the terminal device 120 may communicate with the network device 130. In some embodiments, the terminal device 110 or the terminal device may be user equipment (UE). The network device 130 may be for example a gNB. In some other embodiments, the terminal device 110, the terminal device 120, and network device 130 may be any electronic device supporting wired/wireless communication.

It is to be understood that the number of the terminal devices and the number of the network devices as shown in the environment 100 in FIG. 1 are only for the purpose of illustration, without any limitation to the scope of the present disclosure. In some example embodiments, the environment 100 may include any number of terminal devices and/or any number of network devices.

Communications between devices in the communication environment 100 may be implemented according to any appropriate communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any appropriate wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
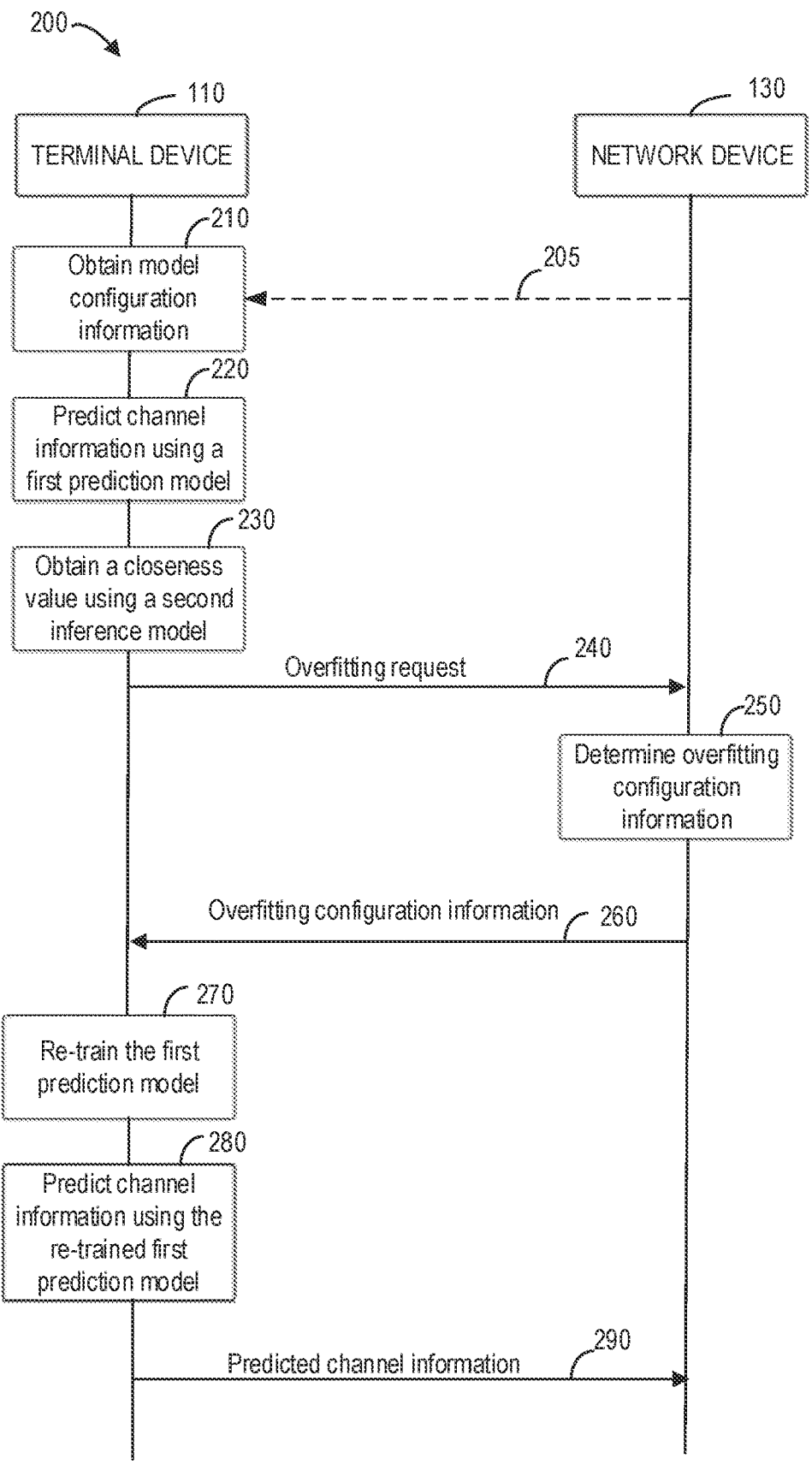
FIG. 2 illustrates an example signaling process for channel prediction according to some embodiments of the present disclosure.

FIG. 2 illustrates an example signaling process 200 for channel prediction according to some embodiments of the present disclosure. For the purpose of discussion, the process 200 will be described with reference to FIG. 1. The process 200 may involve the terminal device 110 and the network device 130 as illustrated in FIG. 1. Although only one terminal device 110 is shown in FIG. 2, it may be understood that, the network device 130 may communicate with more than one terminal device, each of which may implement channel prediction according to the embodiments of the present disclosure. In addition, although the process 200 is described in combination with the communication environment 100 of FIG. 1, the process 200 may be likewise applied to other communication scenarios for implementing channel information prediction.

In the process 200, at 210, the terminal device 110 may obtain model configuration information, and the model configuration information indicates a first prediction model for channel prediction. In some embodiments, the terminal device 110 may receive the model configuration information from the network device 130 as illustrated at 205. For example, the network device 130 may train a model for channel prediction in advance and transmits model configuration information to the terminal device 110.

In some embodiments, the terminal device 110 may obtain the model configuration information from other sources, like another device, for example a third party. In some embodiments, the model may be a vendor specific model and installed in the terminal device 110 in advance. Alternatively, the model may also be build up by a user according to applications of the model. The terminal device 10 may also train the model by itself and accordingly obtain the model configuration information locally.

In some embodiments, the model may include a first prediction model for channel prediction, and the terminal device 110 may obtain the model configuration information on the first prediction model. By using of such model configuration, the first prediction model may be build. By using of the first prediction mode, the terminal device 110 may predict channel prediction at 220 and reported the predicted channel information to the network device 130.

At 260 of FIG. 2, the terminal device 110 may receive overfitting configuration information from the network device 130, and the overfitting configuration information may indicate configuration information for overfitting the first prediction model. The overfitting configuration information may be used to overfit the first prediction model, by re-training the first prediction model.

In some embodiments, the overfitting configuration information may include one or more of the following:
  configuration of channel information reference signals for overfitting the first prediction model;
  a time duration for overfitting the first prediction model;
  a start point for overfitting the first prediction model;
  configuration of bandwidth or bandwidth part for overfitting the first prediction model; or configuration of component carriers for overfitting the first prediction model.

In some embodiments, the network device 130 may transmit the overfitting configuration information in response to an overfitting request transmitted from the terminal device 110. For example, the terminal device 110 may transmit an overfitting request for overfitting the first prediction model at 240, and the network device 130 transmits the overfitting configuration information at 260.

In some embodiments, the terminal device 110 may transmit the overfitting request for overfitting the first prediction model based on predetermined trigger condition. In some embodiments, the terminal device 110 may send the overfitting request based on an obtained difference D1 and a predetermined threshold. The difference D1 may represents a difference of channel information predicted using the first prediction model and corresponding measured channel information, which may indicate an accuracy degree of the first prediction module for the terminal device.

In some embodiments, the difference D1 may be obtained based on channel information as predicted previously using the first prediction model and measured channel information corresponding to the channel information as predicted. For example, as shown in FIG. 2, at 220, the terminal device 110 may predict channel information using the first prediction model. For illustrative purposes, the prediction process may be described in combination with reference to FIG. 3A.

Figure 3A:
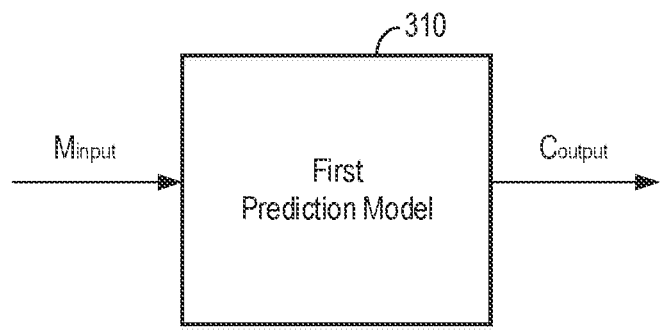
FIG. 3A illustrates an example of a first prediction model according to some embodiments of the present disclosure.

FIG. 3A illustrates an example of the first prediction model 310 according to some embodiments of the present disclosure. As shown in FIG. 3A, the first prediction model has model inputs $M_{input}$ based on which the first prediction model may perform channel predictions and output predicted channel information $C_{output}$. The predicted channel information $C_{output}$ may be reported to the network device 130, and may also be used for estimating the accuracy degree of the first prediction model in the terminal device.

To obtain the difference D1, the terminal device 110 collects a first set of measurements e.g., M1 for a first time duration T1. Based on the first set of measurements M1 as inputs, $M_{input}$ the terminal device 110 may predict channel information e.g., C1 for a second time duration T2 using the first prediction model 310. The time duration T2 is after the time duration T1. In other words, the first prediction model may predict future channel information based on historical measured channel information.

After the time period T2, the terminal device 110 may collect a second set of measurements M2 for the second time duration T2. In other words, the second set of measurements M2 is collected within the time duration same as the channel information C1. Therefore, the second set of measurements M2 corresponds to the channel information C1 in time duration, and their only difference lies in that the first set of measurements M2 is actually measured channel information and the channel information C1 includes channel information predicted using the first prediction model.

The terminal device 110 may obtains the difference between the predicted channel information C1 and the second set of measurements M2 for the second time duration T2 to determine the difference D1. The terminal device 110 determines whether to transmit the overfitting request to the network device 130 in accordance with the difference D1 and the predetermined threshold TH1. The predetermined threshold TH1 may represent the lowest acceptable accuracy degree of the first prediction model to the terminal device. It may be used as a factor whether to trigger an overfitting operation.

For example, if the difference D1 is greater than the predetermined threshold TH1, which indicates that the difference between the predicted channel information C1 and the second set of measurements M2 is relatively large, the terminal device 110 may transmit the overfitting request to the network device 130 for triggering the operation of re-training of the first prediction model. If the difference D1 is less than the predetermined threshold TH1, which indicates that the prediction accuracy of the first prediction model 310 is acceptable, and in such case, the terminal device 110 may not transmit any overfitting request to the network device 130 but keep using the first prediction model to predict channel information.

In some embodiments, the terminal device may transmit the difference D1 to the network device 130, and based on such information, the network device may determine the overfitting configuration information. In some embodiment, the terminal device 110 may transmit, within the overfitting request, information on the difference D1 to the network device 130. In some embodiment, the terminal device 110 may transmit the difference D1 to the network device 130, separately from the overfitting request.

In some embodiments, the terminal device 110 may transmit the overfitting request for overfitting the first prediction model at 240 based on the closeness value and another predetermined threshold TH2. The closeness value indicates prediction accuracy level of the first prediction model 310. The predetermined threshold TH2 indicates an acceptable accuracy level of the first prediction model.

In some embodiments, the model may include a second inference model for inferring a closeness value of the first prediction model, in addition to the first prediction model for channel prediction. Accordingly, the terminal device 110 may further obtain model configuration information on the second inference model.

In such a case, as illustrated in FIG. 2, at 230, the terminal device 110 may obtain the closeness value using the second inference model. The inference process for the closeness value will be described in combination with FIG. 3B.

Figure 3B:
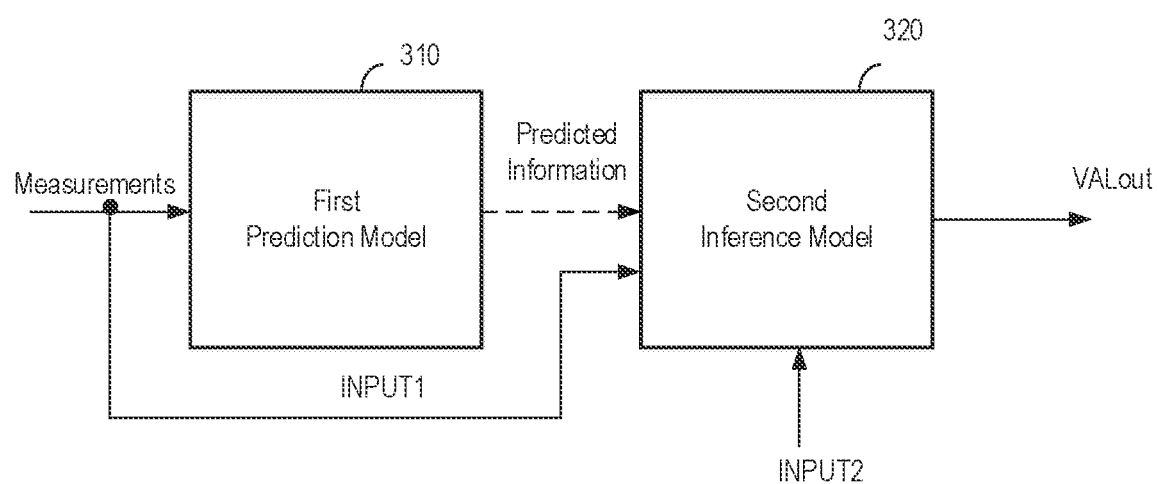
FIG. 3B illustrates an example of a first prediction model and a second inference model according to some embodiments of the present disclosure.

FIG. 3B illustrates an example of the second inference model 320 according to some embodiments of the present disclosure. As illustrated in FIG. 3B, the terminal device 110, by using the second inference model 320, may obtain the closeness value according to channel measurements, e.g., INPUT1, and these channel measurements may also be used for channel prediction by the first prediction model 310.

In some embodiments, the second inference model 320 may obtain the closeness value further with reference to corresponding predicted channel information from, for example, the first prediction model 310. In such a case, both the channel measurement and corresponding predicted channel information may be used to infer the closeness value. In some embodiments, the second inference model 320 may obtain the closeness value with reference to corresponding predicted channel information from both the first prediction model 310 and channel measurements, e.g. INPUT1.

In some embodiments, the closeness value $VAL_{out}$ can be obtained further based on history closeness information and reference signal characteristics, e.g., INPUT2. The history closeness information and reference signal characteristics may include at least one of the closeness map, building vector data map (BVDM), overfitting area, last overfitting time of the first prediction model 310, or channel information characteristic. For CSI prediction, the channel information characteristic may include the number of multipath components (MPC), delay spread, etc. Based on these parameters, it may obtain the closeness value. The detailed process of closeness value will be described with reference to FIGS. 7A and 7B and thus will not be elaborated here.

In some embodiments, the closeness value may be for example quantized to a value ranging from 0 to 1. The closer to 1, the more accuracy of the first prediction model 310. In other words, the closer to 1, the terminal device 110 is more certain that the first set of measurements M1 is within the dataset used to train the first prediction model 310 and/or that the first prediction model provides a close-to-optimum CSI prediction. Close-to-optimum means the best CSI prediction performance may be achieved after overfitting.

In some embodiments, the terminal device 110 may transmit the overfitting request at 240 based on the closeness value. For example, if the terminal device 110 determines that the closeness value is lower than the predefined threshold TH2, the terminal device 110 transmits the overfitting request 240 to the network device 110; otherwise, the terminal device 110 may still use the current first prediction model.

In some embodiments, the terminal device 110 may transmit the closeness value to the network device 110 separately from the overfitting request. In some embodiments, the terminal device 110 may transmit the closeness value in the overfitting request to the network device 130. In some embodiment, the terminal device 110 transmits the closeness value when the closeness value is relative low, e.g., lower than the predefined value, while the terminal device 110 does not transmit the overfitting request when the closeness value is relatively high (e.g., higher than the predefined value). That is, reporting the closeness value can be avoided for a large closeness value, which can reduce channel resources.

Referring back to FIG. 2, after receiving the overfitting request from the terminal device 110, the network device 130, at 250, determines overfitting configuration information. As stated above, the overfitting configuration information may include one or more of the following: configuration of channel information reference signals for overfitting the first prediction model; a time duration for overfitting the first prediction model; a start point for overfitting the first prediction model; configuration of bandwidth or bandwidth part for overfitting the first prediction model; or configuration of component carriers for overfitting the first prediction model.

If the closeness value is received from the terminal device 110, the network device 130 may be aware about the current performance of channel prediction of the first prediction model. Based on the received closeness value, the network device 130 may configure the terminal device 110 to do an overfitting using channel information reference signals over certain time duration, or in certain cases, e.g., low load.

Specifically, in some embodiments, the network device 130 may determine the time duration $T_{OF}$ for overfitting the first prediction model based on the closeness value. In some embodiments, channel information reference signal transmission for overfitting the first prediction model may be configured during the time duration $T_{OF}$. Specifically, the time duration $T_{OF}$ for overfitting the first prediction model may be inversely proportional to the closeness value. In other words, lower closeness values may need larger time durations $T_{OF}$ in order to achieve desirable performance and vice versa.

For illustrative purposes, an example of closeness value and corresponding time duration $T_{OF}$ for overfitting is provided in the following Table 1.

TABLE 1

| Quantized closeness value | Meaning | Required time duration for overfitting |
| --- | --- | --- |
| 0-0.25 | Long-time duration for overfitting | 200 ms |
| 0.25-0.5 | Moderate-time duration for overfitting | 150 ms |
| 0.5-0.75 | Short-time duration for overfitting | 100 ms |
| 0.75-1 | No overfitting | 0 ms |

According to Table 1, 4 levels of overfitting are requested:
no overfitting, with closeness values 0.75-1;
short-time duration for overfitting, with closeness values 0.5-0.75;
moderate-time duration for overfitting, with closeness values 0.25-0.5; and
long-time duration for overfitting, with closeness values 0-0.25.

Each level in Table 1 specifies for how long the first prediction model should be overfitted. The network device 130 may determine the time duration $T_{OF}$ for overfitting the first prediction model according to the provided levels on the basis of the received closeness value.

It can be understood that, although the closeness value is described in a range from 0 to 1, and the levels of overfitting are categorized into four levels, these are for illustration purposes. The closeness value may be any other values in various ranges and the number of levels for overfitting can be varied.

In addition, in some embodiments, the network device 130 may also receive information on a location of the terminal device 110 from the overfitting request or from overfitting information transmitted by the terminal device 110 separately from the overfitting request. That is, the terminal device 110 may also transmit the closeness value/the difference, along with the location information of the terminal device 110, either in the overfitting request or in overfitting information transmitted separately from the overfitting request.

In some embodiment, the network device 130 may transmit a request message to the terminal device 110 requesting the overfitting information including, but not limited to, last overfitting procedure, last time duration for overfitting, closeness level, difference of the channel information predicted using the first prediction model and corresponding measured channel information, and location information.

In some embodiment, the network device 130 may use the location of the terminal device 110 to build up a closeness map for the first prediction model. As the network device 130 communicates with multiple terminal devices within its coverage area, the closeness map is created on the basis of the closeness values and locations of the terminal devices within its coverage area. In case any terminal device may report the latest achieved closeness level, the network device 130 may store the latest closeness value and updates the closeness map according to the latest closeness value.

As stated above, the network device 130 may obtain the location and a closeness value of the terminal device 110 from the overfitting request transmitted by the terminal device, or from the overfitting information which is transmitted by the terminal device 110 in response to the request message. Alternatively, the network device 130 may store the latest overfitting status of the terminal device 110 and other active terminal devices with a goal to minimize the PUCCH overhead.

Based on the closeness map, the network device 130 can determine overfitting configuration information for the terminal device 110 if the first prediction model 310 in the first terminal device 110 needs an overfitting. For example, the network device 130 may determine when the overfitting starts (e.g., a start point for overfitting the first prediction model), which type of overfitting, for example, short-time duration overfitting, moderate-time duration for overfitting, or long-time duration for overfitting, with corresponding time duration $T_{OF}$.

The network device 130 may further configure the channel information reference signal depending on the location of the terminal device 110, e.g., CSI-RS transmissions. The network device 130 may further configure bandwidth or bandwidth part for overfitting the first prediction model, the component carriers for overfitting the first prediction model on the basis of the closeness map. It may be understood that, any other channel related information, which may be used to overfitting the first prediction model, may also be determined by the network device on the basis of the closeness value and/or the closeness map, according to different requirements of implementation of the first prediction model.

Based on the area specific knowledge stored in the closeness map, the network device 130 may learn which prediction model in the cell performs well and which terminal device requires overfitting, and how long the overfitting will configured for the particular terminal device, etc. That is, the network device 130 can learn and track the performance of the currently used prediction model and identify an area in the cell that need long-time duration or short-time duration overfitting training per terminal device.

Moreover, the network device 130 may also infer, in advance, for a terminal device entering the cell what level of overfitting will be needed and configure the best fitting channel information reference signal transmission during the time duration $T_{OF}$, e.g., CSI-RS transmission during the time duration $T_{OF}$. Then, the network device 130 may inform that a new channel information reference signal e.g., CSI-RS, transmission for overfitting with time duration $T_{OF}$ will take place and starts the channel information reference signal e.g., CSI-RS transmission.

By using of the closeness map, the network device 130 may pre-configure channel information reference signals, e.g., CSI RSs, based on the current terminal device distribution. In addition, the network device 130 may also utilize the closeness map to compare the relative performance of different prediction models, which allows the network device 130 to identify and select, after a time period, the best fitting generalized prediction model for a terminal device. Therefore, the performance of channel prediction can be further significantly improved with greatly reduced complexity.

Furthermore, in some embodiments, the network device 130 may further transmit the closeness map to the terminal device 110. For example, the network device 130 may broadcast the closeness map to all terminal devices in the cell to support the inference of the closeness values in the second inference model. The terminal device 110 may use the received closeness map as an input of the second inference model 320 (as illustrated in FIG. 3B) for inferring the closeness value to obtain an improved inference performance.

Referring back to FIG. 2, after receiving the overfitting configuration information at 260, the terminal device 110 may re-train, at 270, the first prediction model by using the overfitting configuration information and obtain an overfitted model.

As described above, the overfitting configuration information may include: configuration of channel information reference signals for overfitting the first prediction model; a time duration for overfitting the first prediction model; a start point for overfitting the first prediction model; configuration of bandwidth or bandwidth part for overfitting the first prediction model; or configuration of component carriers for overfitting the first prediction model. Based on the overfitting configuration information, the terminal device may re-train the first prediction model.

For example, the terminal device 110 may use the configuration of channel information reference signals over the time duration $T_{OF}$ and collect a third set of channel measurements M3 on the reference signals for the time duration $T_{OF}$. The collected third set of channel measurements M3 on the reference signals for the time duration $T_{OF}$ may be used as ground truth to re-training the first prediction model. In addition, the terminal device 110 may also re-train the first prediction model at the start point with a particular bandwidth and/or a particular component carrier as indicated by the overfitting configuration information.

In some embodiment, the terminal device 110 may also request time duration $T_{RE}$ for overfitting the first prediction model, either in the overfitting request or in the overfitting information transmitted separately from the overfitting request. In some embodiments, the terminal device 110 may determine the requested time duration $T_{RE}$ according to the closeness value. After receiving the overfitting configuration information, the terminal device 110 may compare the requested time duration $T_{RE}$ with the overfitting time duration $T_{OF}$. If the terminal device 110 determines that the overfitting time duration $T_{OF}$ is less than the requested time duration $T_{RE}$, the terminal device 110 re-trains the first prediction model in a number of iterations greater than that corresponding to the time duration as indicated by the overfitting configuration information.

For example, if the overfitting time duration $T_{OF}$ is 100 ms and the requested time duration $T_{RE}$, is 150 ms, the terminal device 110 determines that the overfitting time duration $T_{OF}$ is less than the requested time duration $T_{RE}$. That may indicate, the terminal device 110 needs configurations on channel information reference signals over a time duration longer than the overfitting time duration $T_{OF}$. Therefore, if the overfitting time duration $T_{OF}$ corresponds to $A_{num}$ times of iterations, the terminal device 110 may re-train the first prediction model $B_{num}$ times of iterations, wherein $B_{num}$ is greater than $A_{num}$, and both $A_{num}$ and $B_{num}$ are integer.

Due to the re-training is mainly based on data sets collected at the terminal device, and thus the first prediction model may become an overfitted model if the first prediction model has been re-trained. After that, the terminal device 110 may collect a fourth set of channel measurements M4 for a fourth time duration T4, and predict, at 280, channel information based on the fourth set of channel measurements M4 using the re-trained first model for a fifth time duration T5 which is after the fourth time duration T4, as shown in FIG. 2. The terminal device 110 may then transmit the predicted channel information to the network device 130 at 290, as shown in FIG. 2.

Advantageously, the terminal devices use overfitting configuration information to have the first prediction model adapted to the current particular radio channel conditions, therefore, performance for the subsequent channel prediction can be improved.

As described above, the terminal device 110 may report the difference D1 or the closeness value to the network device 130, and transmit the overfitting request to the network deice 130 according to the difference D1 or the closeness value. Specifically, if the model includes the first prediction model, the terminal device 110 may obtain the difference D1 using the first prediction model, and if the model includes the first prediction model and the second inference model, the terminal device 110 may obtain the closeness value using the second inference model. In some embodiments, it may be advantageous to employ the closeness value by using the second inference model over the difference D2. For illustrative purposes, the advantages will be described with reference to FIG. 4.

Figure 4:
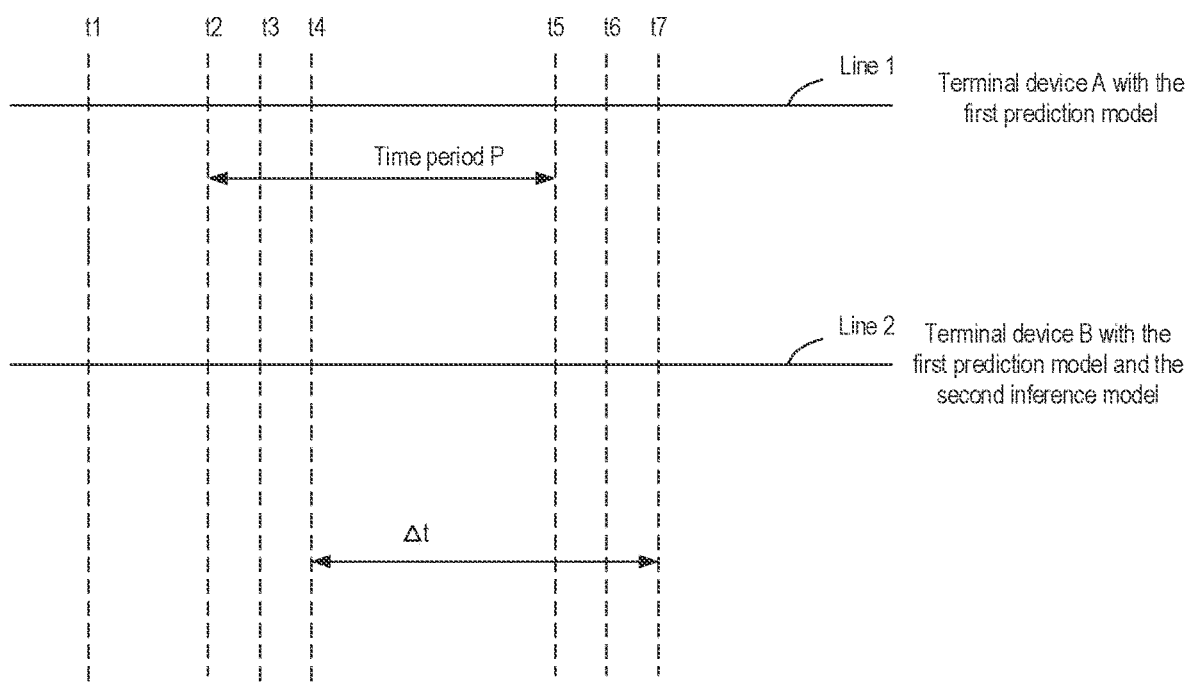
FIG. 4 illustrates an example timing diagram for triggering overfitting of the first prediction model according to example embodiments of the present disclosure.

FIG. 4 is a timing diagram for triggering overfitting of the first prediction model performed by a terminal device with the first prediction model and by a terminal device with the first prediction model and the inference model, respectively. As shown in FIG. 4, Line 1 represents a time diagram for a terminal device A with only the first prediction model; and Line 2 represents a terminal device B with the first prediction model and the second inference model.

For the terminal device with only the first prediction model at Line 1, at t1, the terminal device A obtains model configuration information for the first prediction model. The terminal device A begins to predict channel information $C_p$ for a time duration P, at time t2. After the time period P, at time t5, the terminal device A collects the channel measurements $M_p$ for the time period P. At time t6, the terminal device A compares the collected channel measurements $M_p$ with the predicted channel information $C_p$, and obtains a difference between the channel measurements and predicted channel information. At time t7, the terminal device A triggers overfitting of the first prediction model if the difference is greater than the predetermined threshold.

Now refer to Line 2, at FIG. 4. The terminal device B, with both the first prediction model and the second inference model, obtains model configuration information for the first prediction model and the second inference model, at time t1. The terminal device B predicts channel information by using the first prediction model at t2. As the second inference model is utilized, the terminal device B may obtain the closeness value at time t3. The terminal device B may trigger overfitting of the first prediction model if the closeness value is less than the predefined value, at time t4.

Therefore, from the illustration of FIG. 4, the time for triggering overfitting (if needed) according to the closeness value is earlier than the time for triggering overfitting (if needed) according to the difference, e.g., Δt times earlier. Therefore, when the second inference model is used to infer a closeness value, the latency in signaling that an overfitting is needed can be reduced significantly. In addition, the closeness value inferred by the second inference model provides an expected gain due to overfitting as well as a required number of time observations (e.g., time duration over which the channel information on the reference signal is transmitted by the network device) needed to achieve a desired overfitting gain. Such information cannot be derived from a single comparison of the predicted channel relative to the measurements of the channel. Therefore, it may reduce the complexity greatly, improve the efficiency significantly, and meanwhile enhance the performance for channel prediction substantially.

In view of the above embodiments, it may be seen that advantageously, overfitting is applied to terminal devices having a poor closeness value. The time duration for the channel observation time as well as the transmission of CSI RSs is adapted so that each terminal device can achieve its maximum overfitting gain. Therefore, the solution according to the present disclosure may provide an efficient procedure to achieve overfitting adapted to each terminal device and its channel conditions.

Moreover, using a properly trained AI/ML model (e.g., the second inference model) for inferring the closeness values may provide fast and reliable information about how accurately the generalized AI/ML model (e.g., the first prediction model) covers the current channel conditions. For that purpose, the second inference model is ideally trained directly for the first prediction model. Otherwise, the first prediction model compares its channel predictions with the real measurements of the channel information over many channel prediction events to get a certain knowledge which is also some understanding (although limited) of its closeness status. One other option is that the terminal devices always overfit their AI/ML models, which generates unnecessary processing overhead and CSI RS transmissions.

In addition, by building up a closeness map, the network device can learn and track the performance of the currently used generalized AI/ML model and identify areas in the cell that need high or low overfitting training per terminal device. Furthermore, by broadcasting an overfitting indication, all active terminal devices with low overfitting status can overfit their first prediction model to their current location and radio channel conditions.

Figure 5:
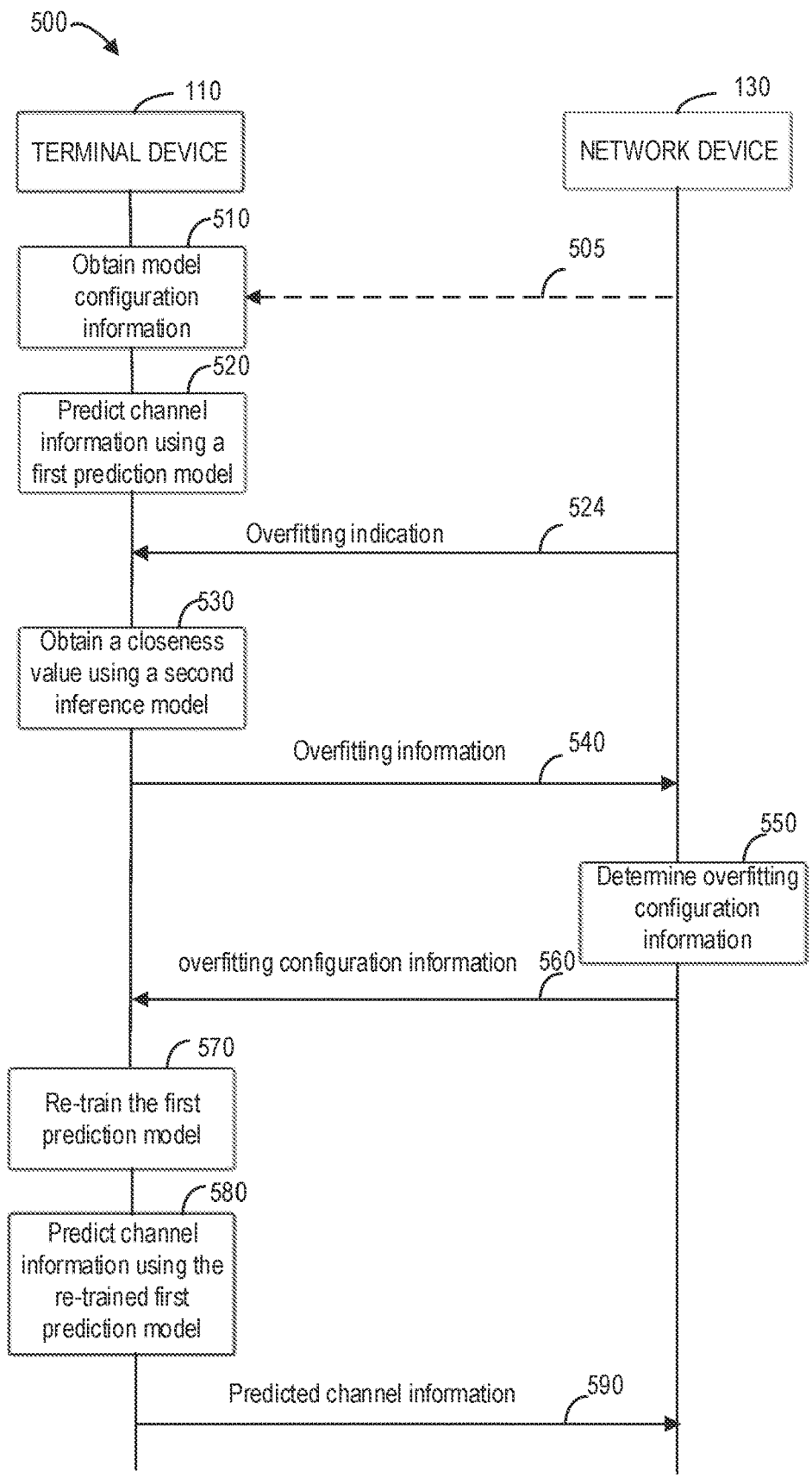
FIG. 5 illustrates another example signaling process for channel prediction according to some embodiments of the present disclosure.

FIG. 5 illustrates another example signaling process 500 for channel prediction according to some embodiments of the present disclosure, which may also achieve similar desirable technical effects. Similar as FIG. 2, the process 500 will be described with reference to FIG. 1. The process 500 may involve the terminal device 110 and the network device 130 as illustrated in FIG. 1. The process 500 in FIG. 5 is for illustration of an embodiment in which the network device 130 triggers the overfitting.

FIG. 5 illustrates an embodiment in which the network device 130 may trigger the overfitting of the first prediction model. As shown in FIG. 5, the processes performed at 510, 520, 530, 550, 560, 570, 580, and 590 are similar with those as shown in FIG. 2, and will not be repetitively described herein for purposes of brevity and clarity.

As illustrated in FIG. 5 at 524, the network device 130 may transmit overfitting indication to the terminal device 100. The overfitting indication may include an overfitting flag that informs the terminal device 110 an opportunity for overfitting the first prediction model. The overfitting indication may also include configuration of channel information on references signals. In some embodiments, the network device 130 transmits the overfitting flag before the configuration of channel information on references signals.

Figure 6:
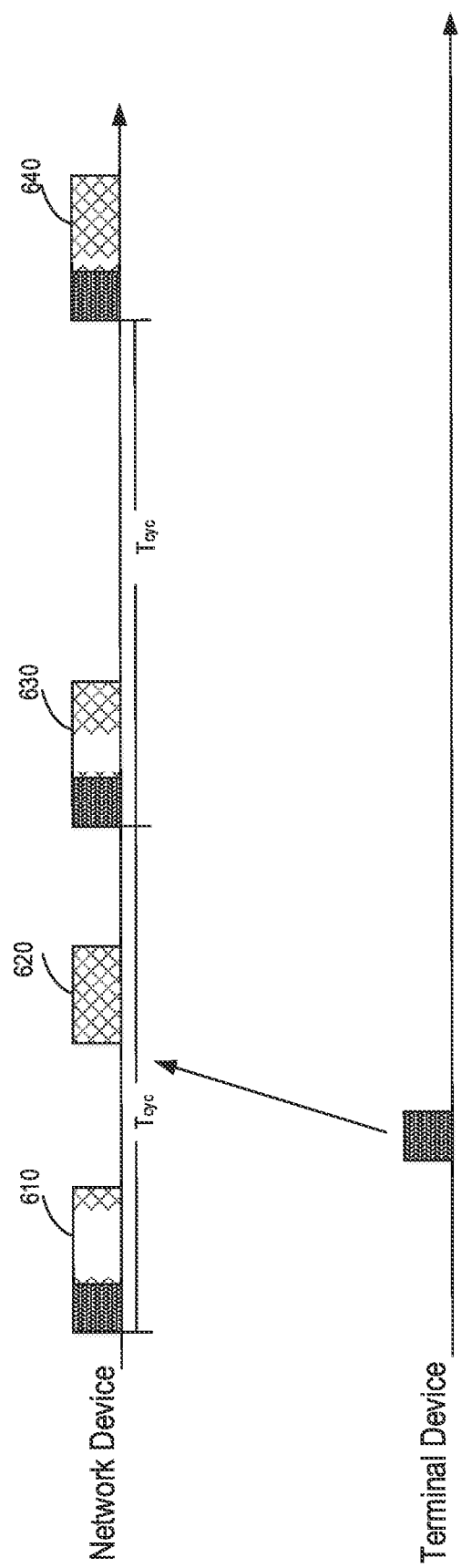
FIG. 6 illustrates a diagram of transmission of the overfitting indication by a network device according to embodiments of the present disclosure.

The network device 130 may transmit overfitting indication regularly (e.g., periodically) or based on a criteria such as the load condition in the cell. For illustrative purposes, FIG. 6 shows a diagram of transmission of the overfitting indication by the network device according to embodiments of the present disclosure. As shown in FIG. 6, the network device 130 may transmit the overfitting indication to the terminal device 110 on periodic transmission occasions as illustrated by 610, 630, 640. The overfitting indication includes an overfitting flag and configuration of channel information on references signals, e.g., CSI-RS. The network device 130 transmits the overfitting flags and CSI-RS to the terminal device 110, and the terminal device 110 receives the overfitting flags and CSI-RS from the network device 130.

In some embodiments, the network device 130 may transmit the overfitting indication aperiodically. For example, the overfitting indication may be triggered by certain events or conditions. If a new terminal device arrives or gets active, the time period to the next overfitting opportunity might be too large and the new arrived or active terminal device may request an intermediate overfitting opportunity from the network device 130. For example, the terminal device 110 may transmit on the uplink control information (UCI) channel an overfitting flag (e.g., Flag 2 as shown in FIG. 6) to the network device 130. The network device 130 may response to the Flag 3 to transmit the overfitting indication as illustrated by 620.

Although FIG. 6 shows the network device transmits the overfitting indication to one terminal device, it can be understood that the network device may also broadcast or multicast the overfitting indication including the overfitting flag to inform all terminal devices in the cell about the next overfitting opportunity. In addition, the flags are transmitted immediately after the CSI-RS, these skilled in the art may understand that the flags may be transmitted after the CSI-RS a time period later, which is not limited in the present disclosure.

Referring back to FIG. 5, when the terminal device 110 determines to re-train the first prediction model, the terminal device 110 may transmit overfitting information to the network device 130 at 540. In some embodiments, the overfitting information may include one or more of: information on closeness value, information on the difference of channel information predicted using the first prediction model and corresponding measured channel information, or the information on a location of the terminal device. When receiving the overfitting information, the network device 130 may determine the overfitting configuration information at 550 and then transmit the overfitting configuration information to the terminal device at 560. It is noticed that operations at 550 may be similar to the operations performed at 250, and will not be repetitively described herein for purposes of brevity and clarity.

Although the operation of transmitting the overfitting indication by the network device 130 is shown at 524 in FIG. 5, it can be understood that, as the network device 130 may transmit the overfitting indication periodically or according to certain events or conditions, operations of transmitting the overfitting indication by the network device 130 can occur at any stage of communication between the terminal device 110 and the network device 130. For example, the operation of transmitting the overfitting indication can be before 540 and after 530. For the purpose of clarity and brevity, FIG. 5 shows one operation of transmitting the overfitting indication, it can be understood that, multiple times of operations of transmitting the overfitting indication can be transmitted in the process 500.

The example signaling processes for channel prediction has been described with reference to FIGS. 2-6. It is known that, overfitting usually should be avoided in machine learning, as overfitting has an impact on generalization. However, the terminal devices of the present disclosure use overfitting configuration information to have the first prediction model re-trained to be an overfitted model, which can be greatly adapted to the current radio channel conditions. Therefore, the performance of the channel prediction to the current particular radio channel conditions has been significantly improved.

The first prediction model may be used to predict channel information, e.g., CSI. The first prediction model may be trained using supervised learning which is based on a collection of a reasonable large simulated dataset. For example, channel coefficients for a time duration X over $N_{fft}$ subcarriers can be collected as the dataset for training the first prediction model. The first prediction model can generate channel coefficients for a prediction horizon Y over $N_{fft}$ subcarriers. A loss function may be determined according to mean squared error (MSE) and/or cosine similarity. The training process for the first prediction model may be performed at the network device 130. Alternatively, the training process for the first prediction model may be performed at another device, for example, a remote server, or another network device, and the network device 130 may obtain the trained first prediction model from the another device.

The second inference model includes a classifier that generates the closeness measurement. The training process for the second inference model can be described with reference to FIG. 7A and FIG. 7B. The second inference model may be trained together with the first prediction model. The device performing the training process may include the network device 130, the terminal device 110, and other devices that have the training capacity. For the purpose of clarity, the device performing the training process is referred to be "training device".

Figure 7A:
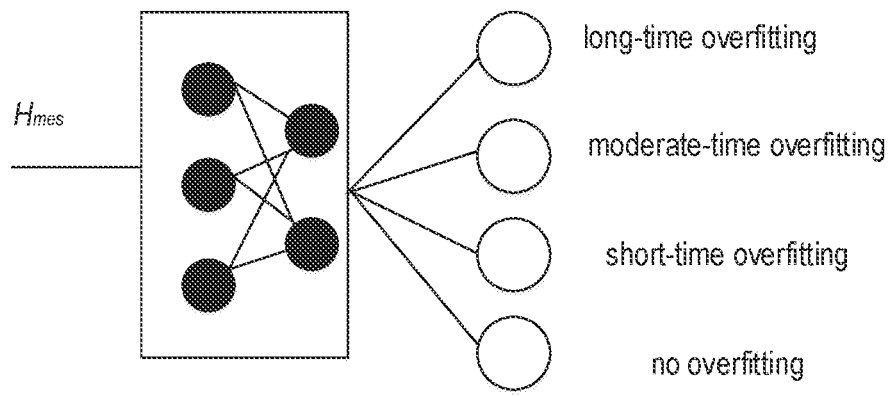
FIG. 7A illustrates an example training process for the second inference model according to embodiments of the present disclosure.

FIG. 7A illustrates an example training process for the second inference model according to embodiments of the present disclosure. The training device trains the second inference model using supervised learning with multiclass label encoding. That is, the training device may train the second inference model using supervised learning approach where, e.g., 4 classes are proposed in accordance with Table 1. Taking 4 classes as an example, the training device may generate 4 labels that define the 4 groups. The training device may run the first prediction model at inference mode and collects normalized squared error (NSE) cumulative distribution function (CDF) performance curve, and then perform overfitting for the first prediction model using 3 configurations of time duration: short-time, moderate-time, and long-time.

For each overfitting configuration, the training process may store how much overfitting gain is achieved. Channels that have no overfitting gain may receive class label "no overfitting" (represented by [1 0 0 0]). Channels that have overfitting gain for all 3 configuration receive label may be represented by [0 1 1 1]. Channels that have overfitting gain for long-time overfitting may be represented by [0 0 0 1].

In case multiple configurations are beneficial, the terminal device may decide afterwards which one to trigger. Nonetheless, regarding latency and overhead reduction, selecting the shortest-time overfitting configuration may be the most efficient choice. This may depend on the required prediction performance under the current cell conditions. Based on those derived labels, the multiclass classifier can be trained as:

Input: channel information dataset $H_{mes}$, which is the same that is input to the first prediction model;
Output: class label vector of size 4 in the exemplary case;
Loss function: binary cross-entropy between the label y (e.g., [1 0 0 0]). The estimated output ŷ as:

$$\mathcal{L}(y, \hat{y}) = -\frac{1}{N}\sum_{i=1}^{N} y_i \log \hat{y}_i + (1-y_i)\log(1-\hat{y}_i) \quad \text{(Equation 1)}$$

where N is the number of output classes, which is N=4 in the example.

Figure 7B:
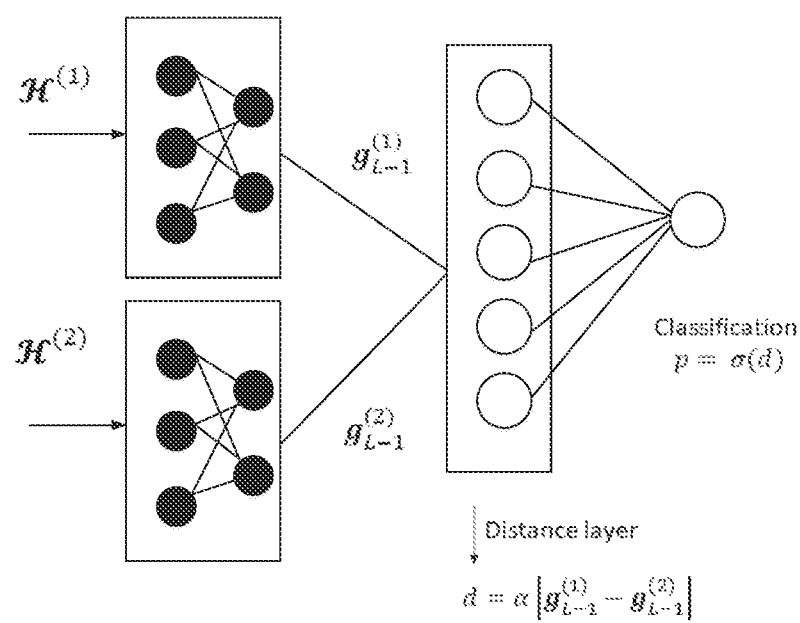
FIG. 7B illustrates another example training process for the second inference model according to embodiments of the present disclosure.

FIG. 7B illustrates another example training process for the second inference model according to embodiments of the present disclosure. The network for few-shot learning where the classification p may be aimed closeness measure. $\mathcal{H}^{(1)}$ and $\mathcal{H}^{(2)}$ may be the input channels to be compared, $g_{L-1}^{(1)}$ and $g_{L-1}^{(2)}$ may be respective embeddings. The distance between the embeddings may be computed and passed by a sigmoid activation function to generate the classification output p, which may be approximate to [0, 1].

The training device may train the second inference model using few-shot learning approach. For this training, the training device may first generate a pair of two groups of channel information dataset. The first group of the pair may be the same with channel information dataset used to train the first prediction model. The second group of the pair may be different from the channel information dataset used to train the first prediction model. In order to generate the pair of groups, the training device may input channel information dataset to the first prediction model, and run the first prediction model at inference mode and collect for example normalized squared error (NSE) cumulative distribution function (CDF) performance curve of the first prediction model.

When the NSE of the first prediction model is below or equal the SNR of the simulated channels, the channel information dataset may be considered as the first group. When the performance of the first prediction model is above the SNR of the simulated channels, the channel information dataset may be considered as the second group. Alternatively, the training device may generate the pair of groups by running overfitting for a fixed number of iterations on the basis of the channel information dataset. If the overfitting gain is below the threshold (e.g., 3 dB), the channel information dataset may be considered as the first group. If the overfitting gain is above the threshold, the channel information dataset may be considered as the second group.

Based on those derived labels, the process for training the second inference model can be trained as:

Input: pair of channels $[\mathcal{H}^{(1)}, \mathcal{H}^{(2)}]$, where $\mathcal{H}^{(1)}$ is a channel in the training set of the first prediction model, and $\mathcal{H}^{(2)}$ is a query channel;

Output: value between [0,1], 0–$\mathcal{H}^{(2)}$ is outside the training set for training the first prediction model, 1–$\mathcal{H}^{(2)}$ is within the training set for training the first prediction model.

Loss function:
$$\mathcal{L}(\mathcal{H}^{(1)}, \mathcal{H}^{(2)}) =$$
$$y(\mathcal{H}^{(1)}, \mathcal{H}^{(2)})\log p(\mathcal{H}^{(1)}, \mathcal{H}^{(2)}) + (1-y(\mathcal{H}^{(1)},$$
$$\mathcal{H}^{(2)}))\log(1-p(\mathcal{H}^{(1)}, \mathcal{H}^{(2)})) + \lambda^T|w|^2 \quad \text{(Equation 2)}$$

wherein w are the weights of the network, and λ is the vector of regularization weights, one per layer.

In some embodiments, the dataset may be collected from simulations where multiple terminal devices tracks are recorded for a time duration of multiple seconds, e.g., 5 seconds. For example, one MIMO-OFDM UE track $\mathcal{H}_{MIMO} \in \mathbb{C}^{T \times N_{fft} \times N_{tx} \times N_{rx}}$ may contain the channel coefficients for T time samples over all the $N_{fft}$ PRBs, $N_{tx}$ transmitter antenna ports, and $N_{rx}$ receiver antennas. In a situation of CSI prediction, small datasets may perform in well when considering SISO-OFDM channels. Hence, $N_{rx}N_{tx}$ samples of one SISO-OFDM terminal device may be collected as the dataset.

Figure 8:
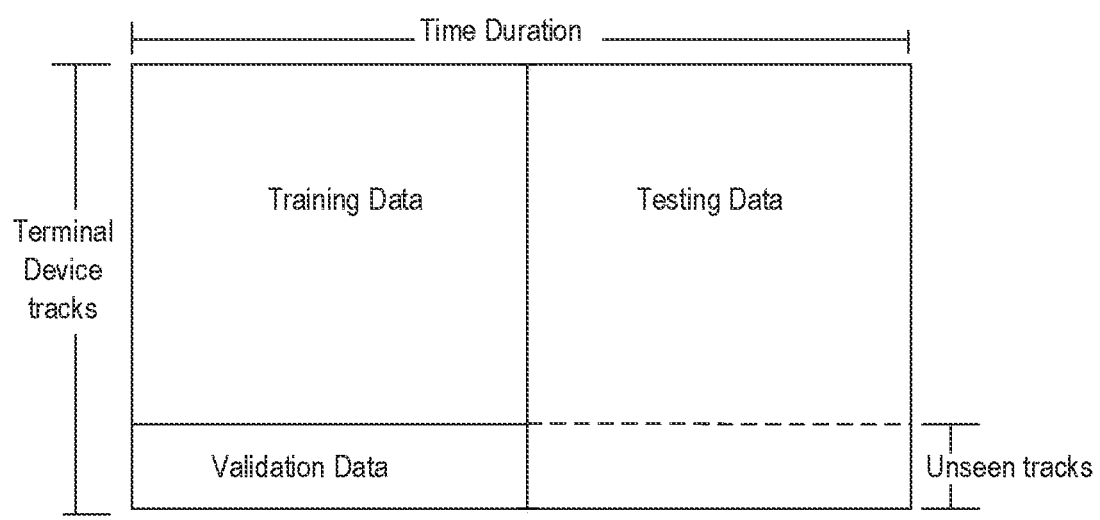
FIG. 8 illustrates a diagram of how the dataset is grouped into training data, validation data and testing data according to embodiments of the present disclosure.

FIG. 8 illustrates a diagram of how the dataset may be grouped into training data, validation data and testing data according to embodiments of the present disclosure. In order for the terminal device 110 to have access to a bigger pool of channel realizations, the training dataset and test dataset may be separated at the time duration dimension, wherein the channel coefficients of the first 50% of the time duration may be taken to train the first prediction model. From those 50% training dataset, 20% of the channels may be taken for the validation dataset which is used to evaluate the generalization capability during training time. In an embodiment, the terminal device tracks only for validation may be not seen during testing, as the time variations may be repetitive in the terminal device tracks at the testing dataset.

In some embodiment, a convolutional LSTM architecture trained under supervised learning may be used to model the first prediction model. For illustration purposes, FIG. 9 illustrates an example sliding window method that may be used to select the inputs and labels (e.g., ground truth) to the prediction problem.

Figure 9:
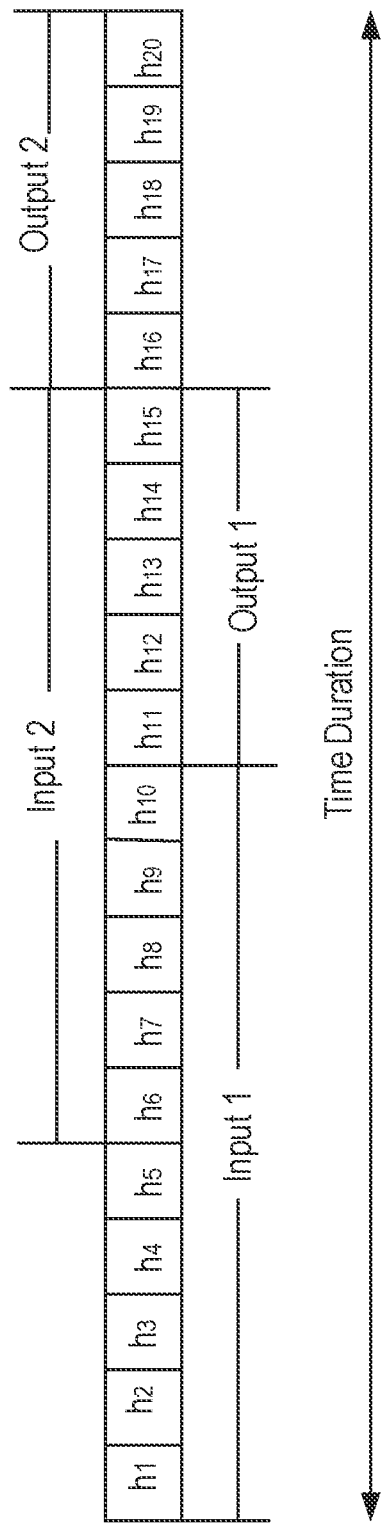
FIG. 9 illustrates a sliding window operation over a track of the training dataset to select input data and the ground truth dataset for training the first prediction model.

As illustrated in FIG. 9, a sliding window operation over a track of the training dataset may be used to select input data and the ground truth dataset for training the first prediction model. The sliding window may have the same size as the output prediction horizon. As shown in FIG. 9, the input may have X=10 time units and the output has Y=5 time units. The second input (e.g., input 2) may include the last five time units of the previous input (e.g., Input 1) and the output (e.g., Output 1) obtained based on the previous input.

Figure 10:
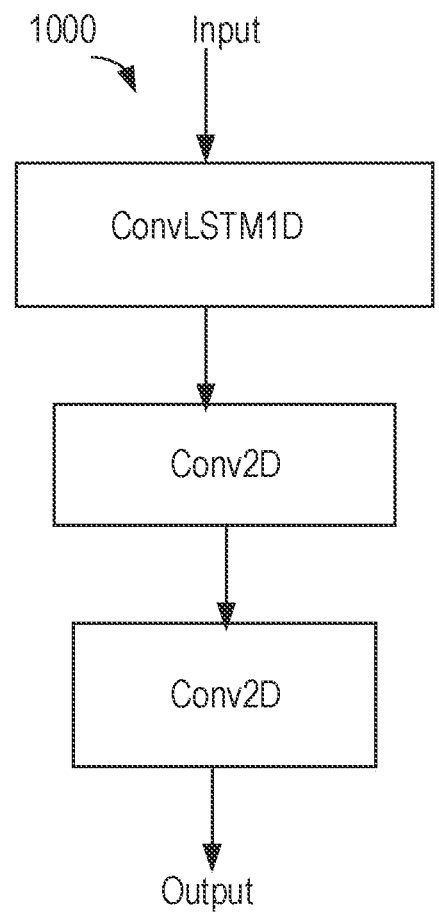
FIG. 10 illustrates an exemplified architecture of the first prediction model.

FIG. 10 illustrates an exemplified architecture of the first prediction model. As shown in FIG. 10, the model may include three layers: ConvLSTM1D, Conv2D, and Conv2D, and may take an input $\mathcal{H}_{siso}^{in} \in \mathbb{R}^{X \times N_{fft} \times 2}$ of 15 ms time duration and outputs a prediction $\widehat{\mathcal{H}}_{siso} \in \mathbb{R}^{Y \times N_{fft} \times 2}$ for the next 5 ms. So X=15 and Y=5 with time resolution between samples of 1 ms. The wireless network can schedule CSI-RS every 5 ms at maximum, so the 1 ms resolution is obtained by upsampling the training dataset. The loss function considered during training of the first prediction model for CSI prediction may be the mean squared error (MSE):

$$\mathcal{L}_{SISO} = \frac{1}{2} \sum_{i=1}^{2} (\mathcal{H}_{SISO} - \widehat{\mathcal{H}}_{SISO})^2 \qquad \text{(Equation 3)}$$

Example configuration for each layer can be found from the following table 2. It may be understood that, other architectures may be used for the first prediction model, including the existing or future developed neuro networks, which is not limited by the present disclosure.

TABLE 2

| Layer | Number of Filters | Filter Shape | padding | Returning sequence |
|---|---|---|---|---|
| ConvLSTM1D | 12 | [5] | same | True |
| Conv2D | 12 | [6, 1] | none | n/a |
| Conv2D | 8 | [6, 1] | none | n/a |

Figure 11:
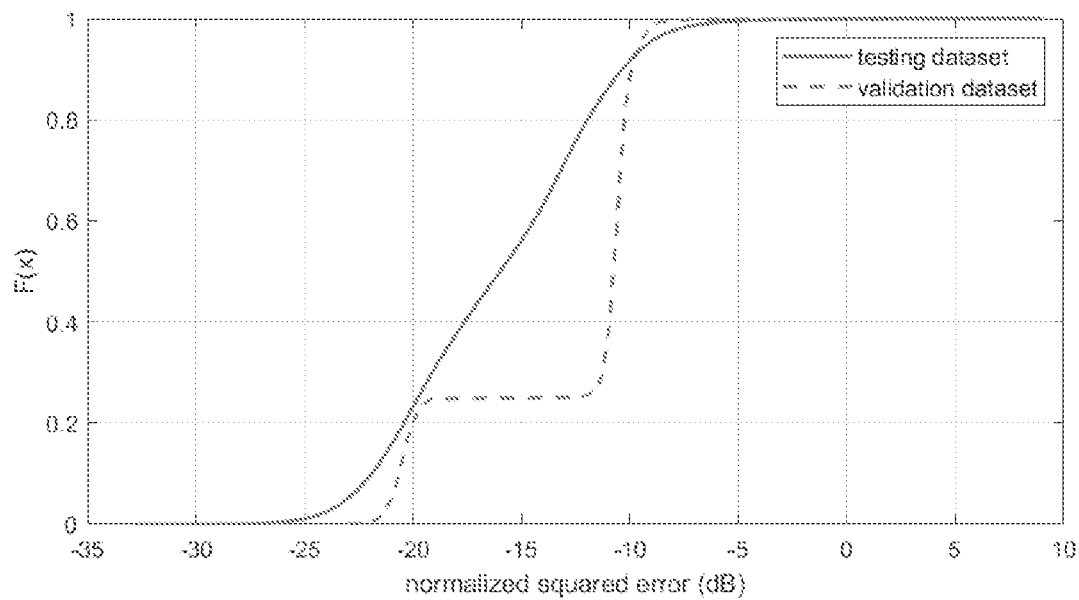
FIG. 11 shows Cumulative distribution function (CDF) of the normalized squared error (NSE) for the training set and the validation set.

FIG. 11 further shows CDF of the normalized squared error (NSE) for the training set and the validation set. The curve represented by a solid line may be the CDF of the NSE for the testing dataset which contains samples of all the terminal device tracks within the simulation. The dashed line may represent the CDF of the NSE for the validation dataset which contains terminal device tracks that are not used to compute the cost function during the training time. It can be observed that only 20% of the validation dataset approach a NSE of −20 dB, and the other 80% have a NSE of −10 dB, which is the worst case value for the testing dataset. This may indicate that the terminal device tracks that are in the validation dataset are not well represented into the training dataset. Hence, there is a generalization issue and the 50% performance is expected to drop by 5 dB for the terminal device tracks not well represented in the training set In order to overcome this performance drop, the terminal device may request a new measurement phase to re-train the first prediction model to overfit its current channel. A procedure may be simulated by taking one terminal device track that is first in the validation dataset. From this terminal device track, 125 ms of the channel are taken for re-training and the last 4.875 s are taken for testing.

Figure 12:
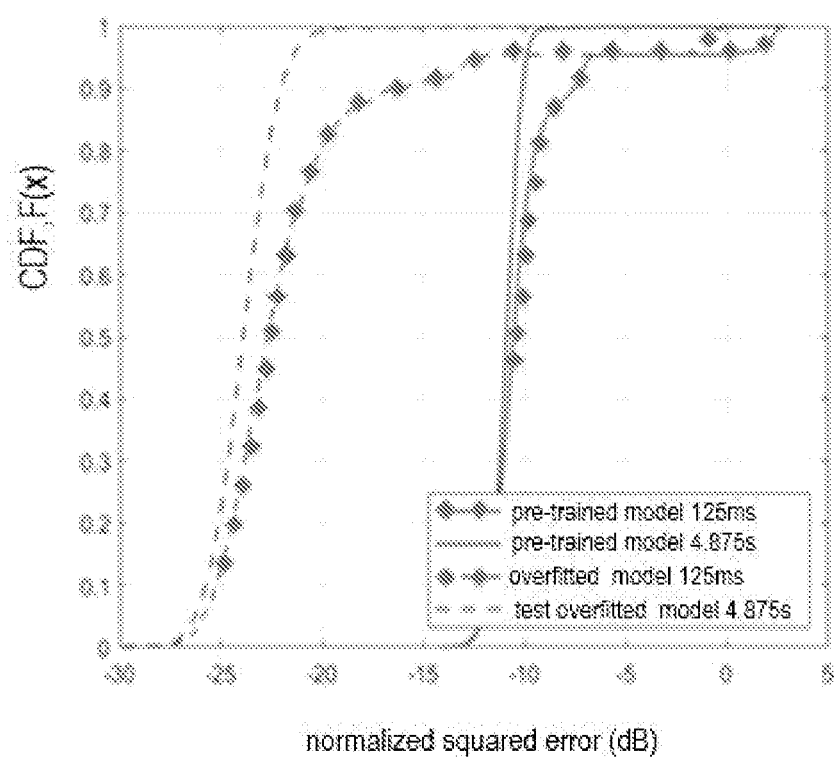
FIG. 12 shows a Cumulative distribution function (CDF) of the NSE for the chosen terminal device track.

FIG. 12 shows a Cumulative distribution function (CDF) of the NSE for the chosen terminal device track. The solid lines with/without diamond blocks may denote the NSE before retraining the first prediction model, and the dashed line with/without diamond blocks may denote the NSE after re-training the first prediction model. The overfitting may be performed for only one epoch and the 50% performance improved about 13 dB for the considered terminal device track. Therefore, overfitting the first prediction model (e.g. CIS predictor) to an overfitted model may have significantly improved the prediction performance.

Figure 13:
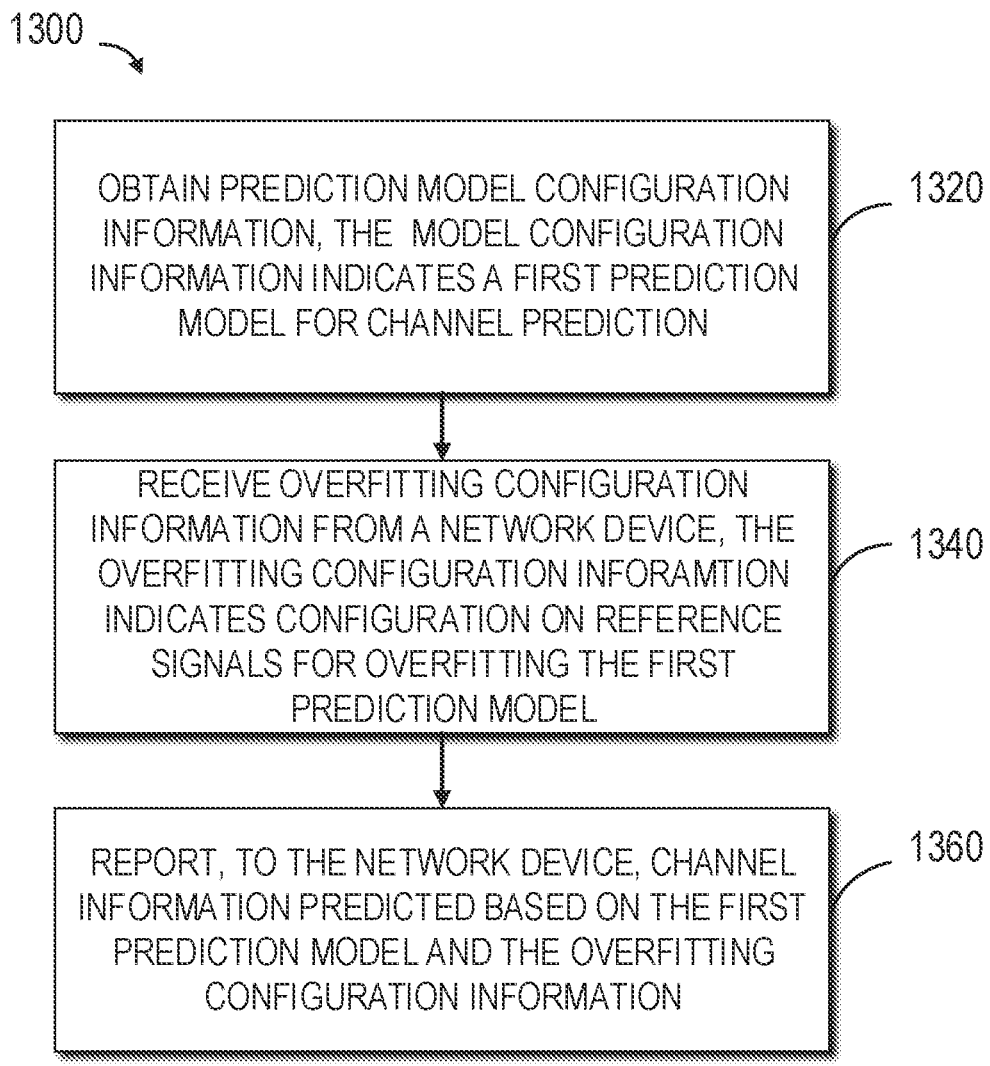
FIG. 13 shows a flowchart of an example method 1300 implemented at a terminal device in accordance with some embodiments of the present disclosure.

FIG. 13 shows a flowchart of an example method 1300 implemented at a terminal device (for example, the terminal device 110) in accordance with some embodiments of the present disclosure. For the purpose of discussion, the method 1300 will be described from the perspective of the terminal device 110 with reference to FIG. 1.

At 1320, the terminal device 110 may obtain model configuration information. The model configuration information indicates a first prediction model for channel prediction. At 1340, the terminal device 110 may receive overfitting configuration information from a network device 130. The overfitting configuration information indicates configuration on reference signals for overfitting by the first prediction model. At 1360, the terminal device 110 may report, to the network device 130, channel information predicted based on the first prediction model and the overfitting configuration information.

In some embodiments, the overfitting configuration information may comprise one or more of: configuration of channel information reference signals for overfitting the first prediction model; a time duration for overfitting the first prediction model; a start point for overfitting the first prediction model; configuration of bandwidth or bandwidth part for overfitting the first prediction model; or configuration of component carriers for overfitting the first prediction model.

In some embodiments, the terminal device 110 may further re-train the first prediction model based on the overfitting configuration information, and obtains the channel information by performing channel prediction based on the re-trained first prediction model.

In some embodiments, the terminal device 110 may re-retrain the first prediction model by: collecting a first set of channel measurements on reference signals for a time duration as indicated by the overfitting configuration information; and re-training the first prediction model based on the first set of channel measurements.

In some embodiments, the terminal device 110 may further collect a second set of channel measurements for a first time duration, and predicts channel information using the first prediction model or a re-trained first model for a second time duration which is after the first time duration, based on the second set of channel measurement.

In some embodiments, the terminal device 110 may further transmit to the network device 130 an overfitting request for the first prediction model to re-train the first prediction model In some embodiments, the terminal device 110 may further receive an overfitting indication for the first prediction model from the network device, and wherein the overfitting indication indicates the terminal device to re-train the first prediction model.

In some embodiments, the terminal device 110 may further obtain a difference of channel information predicted using the first prediction model and corresponding measured channel information.

In some embodiments, the terminal device 110 may further transmit to the network device an overfitting request for the first prediction model based on the obtained difference and a predetermined threshold or transmits to the network device information on the obtained difference.

In some embodiments, the model configuration information may further indicate a second inference model for inferring a closeness value of the first prediction model, and wherein the closeness value indicates prediction accuracy level of the first prediction model.

In some embodiments, the terminal device 110 may further obtain, by using the second inference model, the closeness value based on corresponding measured channel information. In some embodiment, the terminal device 110 may further obtain the closeness value, by using the second inference model, based on corresponding measured channel information and the channel information predicted using the first prediction model, e.g., predicted CSI that is predicted by using the first prediction model.

In some embodiments, the terminal device 110 may further transmit to the network device 130 an overfitting request for overfitting the prediction model based on the closeness value, or transmits to the network device 130 information on the closeness value. In some embodiments, the closeness value is obtained further based on history closeness information and reference signal characteristics.

In some embodiments, the overfitting information may be transmitted to the network device 130, and the overfitting information may comprises one or more of: information on a location of the terminal device; information on the closeness value; or information on a difference of channel information predicted using the first prediction model and corresponding measured channel information.

In some embodiments, the overfitting information may be contained in the overfitting request. In some embodiments, the overfitting information may be transmitted in a separate information report.

In some embodiments, the overfitting request further may include a requested time duration for overfitting the first prediction model, and the terminal device 110 may further determine the time duration as indicated by the overfitting configuration information is less than the requested time duration, and re-trains the first prediction model in a number of iterations greater than that corresponding to the time duration as indicated by the overfitting configuration information.

Advantageously, the terminal devices may use overfitting configuration information including for example CSI RS transmissions over overfitting time duration $T_{OF}$ to have the first prediction model adapted to the current radio channel conditions, therefore, performance for the next channel prediction will be improved.

Figure 14:
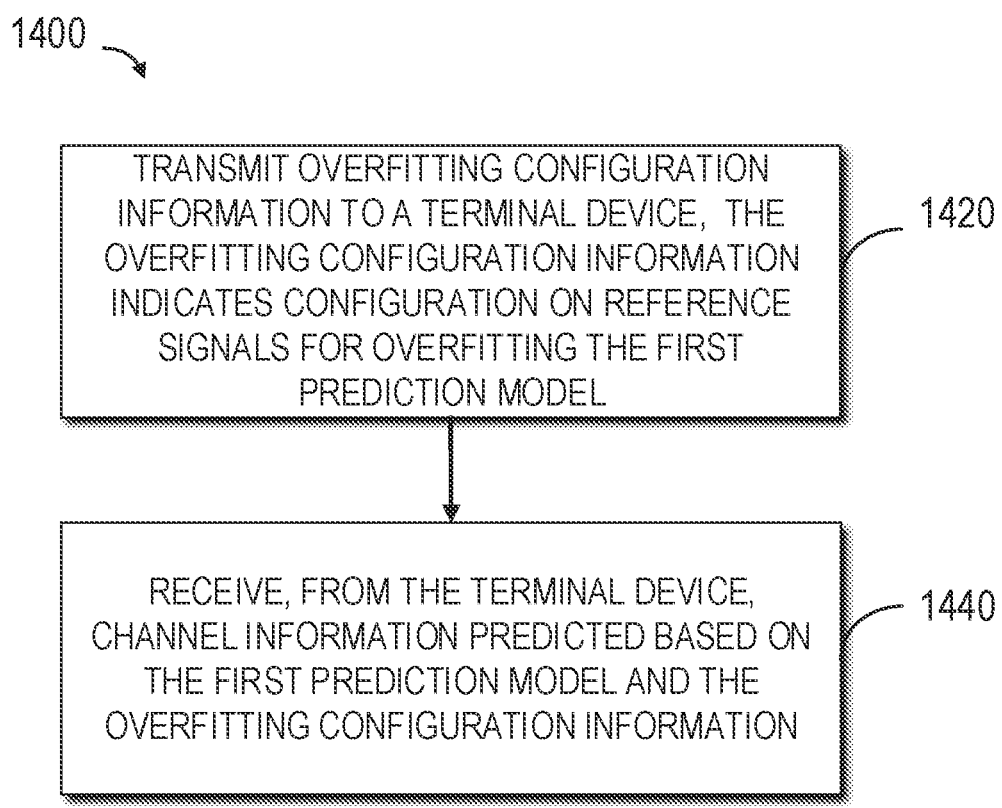
FIG. 14 shows a flowchart of an example method 1400 implemented at a network device in accordance with some embodiments of the present disclosure.

FIG. 14 shows a flowchart of an example method 1400 implemented at a network device (for example, the network device 130) in accordance with some embodiments of the present disclosure. For the purpose of discussion, the method 1400 will be described from the perspective of the network device 130 with reference to FIG. 1.

At 1420, the network device 130 may transmit overfitting configuration information to the terminal device. The overfitting configuration information indicates configuration on reference signals for overfitting the first prediction model. At 1440, the network device 130 may receive, from a terminal device 110, channel information predicted based on the first prediction model and the overfitting configuration information.

In some embodiments, the network device 130 may transmit model configuration information to the terminal device 110, and the model configuration information indicates a first prediction model for channel prediction.

In some embodiments, the overfitting configuration information may comprise one or more of: configuration of channel information reference signals for overfitting the first prediction model; a time duration for overfitting the first prediction model; a start point for overfitting the first prediction model; configuration of bandwidth or bandwidth part for overfitting the first prediction model; or configuration of component carriers for overfitting the first prediction model.

In some embodiments, the network device 130 further may transmit reference signals for overfitting the first prediction model to the terminal device based on the overfitting configuration information.

In some embodiments, the model configuration information further may indicate a second inference model for inferring a closeness value of the first prediction model, and wherein the closeness value indicates prediction accuracy level of the first prediction model.

In some embodiments, the network device 130 may further transmit an overfitting indication, wherein the overfitting indication informs the terminal device an opportunity for re-training the first prediction model, wherein the overfitting configuration information is transmitted after the overfitting indication is transmitted.

In some embodiments, the network device 130 may further receive an information report of overfitting information from the terminal device 110, and the overfitting information includes one or more of: information on a location of the terminal device 110; information on a closeness value; or information on the difference of channel information predicted using the first prediction model and corresponding measured channel information.

In some embodiments, the network device 130 may further receive, from a terminal device 110, an overfitting request for the first prediction model to re-train the first prediction model, and the overfitting configuration information is transmitted in response to receiving the overfitting request.

In some embodiments, the overfitting request may include overfitting information, and the overfitting information comprises one or more of: information on a difference of channel information predicted using the first prediction model and corresponding measured channel information; a closeness value of the first prediction model; or information on a location of the terminal device 110.

In some embodiments, the network device 130 may further create a closeness map based on the overfitting information, wherein the closeness map comprise at least the closeness value of the first prediction model, and locations of the terminal devices, and wherein the overfitting configuration information is determined according to the closeness map.

In some embodiments, the network device 130 may further determine a time duration for overfitting the first prediction model according to the closeness value in the closeness map, and the time duration for overfitting the first prediction model is inversely proportional to the closeness value.

In some embodiments, an apparatus capable of performing any of operations of the method 1300 (for example, the terminal device 110) may include means for performing the respective steps of the method 1300. The means may be implemented in any suitable form. For example, the means may be implemented in a circuitry or software module.

In some embodiments, the apparatus may include means for obtaining model configuration information. The model configuration information may indicate a first prediction model for channel prediction. The apparatus further may include means for receiving overfitting configuration information from a network device 130. The overfitting configuration information may indicate configuration on reference signals for overfitting by the first prediction model. The apparatus further may include means for reporting, to the network device 130, channel information predicted based on the first prediction model and the overfitting configuration information.

In some embodiments, the overfitting configuration information may comprise one or more of: configuration of channel information reference signals for overfitting the first prediction model; a time duration for overfitting the first prediction model; a start point for overfitting the first prediction model; configuration of bandwidth or bandwidth part for overfitting the first prediction model; or configuration of component carriers for overfitting the first prediction model.

In some embodiments, the apparatus further may include means for re-training the first prediction model based on the overfitting configuration information, and include means for obtaining the channel information by performing channel prediction based on the re-trained first prediction model.

In some embodiments, the apparatus may re-retrain the first prediction model by: collecting a first set of channel measurements on reference signals for a time duration as indicated by the overfitting configuration information; and re-training the first prediction model based on the first set of channel measurements.

In some embodiments, the apparatus further may include means for collecting a second set of channel measurements for a first time duration, and include means for predicting channel information using the first prediction model or a re-trained first model for a second time duration which is after the first time duration, based on the second set of channel measurement.

In some embodiments, the apparatus further may include means for transmitting to the network device 130 an overfitting request for the first prediction model to re-train the first prediction model In some embodiments, the apparatus further may include means for receiving an overfitting indication for the first prediction model from the network device, and wherein the overfitting indication indicates the terminal device to re-train the first prediction model.

In some embodiments, the apparatus further may include means for obtaining a difference of channel information predicted using the first prediction model and corresponding measured channel information.

In some embodiments, the apparatus further may include means for transmitting to the network device an overfitting request for the first prediction model based on the obtained difference and a predetermined threshold or transmits to the network device information on the obtained difference.

In some embodiments, the model configuration information may further indicate a second inference model for inferring a closeness value of the first prediction model, and wherein the closeness value indicates prediction accuracy level of the first prediction model.

In some embodiments, the apparatus further may include means for obtaining, by using the second inference model, the closeness value based on corresponding measured channel information. In some embodiment, the terminal device 110 may further include means for obtaining the closeness value, by using the second inference model, based on corresponding measured channel information and the channel information predicted using the first prediction model, e.g., predicted CSI that is predicted by using the first prediction model.

In some embodiments, the apparatus further may include means for transmitting to the network device 130 an overfitting request for overfitting the first prediction model based on the closeness value, or include means for transmitting to the network device 130 information on the closeness value.

In some embodiments, the closeness value may be obtained further based on history closeness information and reference signal characteristics.

In some embodiments, the overfitting information may be transmitted to the network device 130, and the overfitting information comprises one or more of: information on a location of the terminal device; information on the closeness value; or information on a difference of channel information predicted using the first prediction model and corresponding measured channel information.

In some embodiments, the overfitting information may be contained in the overfitting request. In some embodiments, the overfitting information is transmitted in a separate information report.

In some embodiments, the overfitting request further may include a requested time duration for overfitting the first prediction model, and the apparatus further may include means for determining the time duration as indicated by the overfitting configuration information is less than the requested time duration, and re-trains the first prediction model in a number of iterations greater than that corresponding to the time duration as indicated by the overfitting configuration information.

In some embodiments, an apparatus capable of performing any of the method 1400 (for example, the network device 130) may include means for performing the respective steps of the method 1400. The means may be implemented in any suitable form. For example, the means may be implemented in a circuitry or software module.

In some embodiments, the apparatus may include means for transmitting overfitting configuration information to the terminal device. The overfitting configuration information indicates configuration on reference signals for overfitting the first prediction model. The apparatus may further include means receiving, from a terminal device 110, channel information predicted based on the first prediction model and the overfitting configuration information.

In some embodiments, the apparatus may further include means for transmitting model configuration information to the terminal device 110, and the model configuration information indicates a first prediction model for channel prediction.

In some embodiments, the overfitting configuration information comprises one or more of: configuration of channel information reference signals for overfitting the first prediction model; a time duration for overfitting the first prediction model; a start point for overfitting the first prediction model; configuration of bandwidth or bandwidth part for overfitting the first prediction model; or configuration of component carriers for overfitting the first prediction model.

In some embodiments, the apparatus may further include means for transmitting reference signals for overfitting the first prediction model to the terminal device based on the overfitting configuration information.

In some embodiments, the model configuration information may further indicate a second inference model for inferring a closeness value of the first prediction model, and the closeness value indicates prediction accuracy level of the first prediction model.

In some embodiments, apparatus may further include means for transmitting an overfitting indication, wherein the overfitting indication informs the terminal device an opportunity for re-training the first prediction model, wherein the overfitting configuration information is transmitted after the overfitting indication is transmitted.

In some embodiments, the apparatus may further include means for receiving an information report of overfitting information from the terminal device 110, and the overfitting information includes one or more of: information on a location of the terminal device 110; information on the closeness value; or information on the difference of channel information predicted using the first prediction model and corresponding measured channel information.

In some embodiments, the apparatus may further include means for receiving, from a terminal device 110, an overfitting request for the prediction model to re-train the first prediction model, wherein the overfitting configuration information is transmitted in response to receiving the overfitting request.

In some embodiments, the overfitting request includes overfitting information, and the overfitting information comprises one or more of: information on a difference of channel information predicted using the first prediction model and corresponding measured channel information; a closeness value of the first prediction model; or information on a location of the terminal device 110.

In some embodiments, the apparatus may further include means for creating a closeness map based on the overfitting information, wherein the closeness map comprise at least the closeness value of the first prediction model, and locations of the terminal devices and wherein the overfitting configuration information is determined according to the closeness map.

In some embodiments, the apparatus may further include means for determining a time duration for overfitting the first prediction model according to the closeness value in the closeness map, wherein the time duration for overfitting the first prediction model is inversely proportional to the closeness value.

Figure 15:
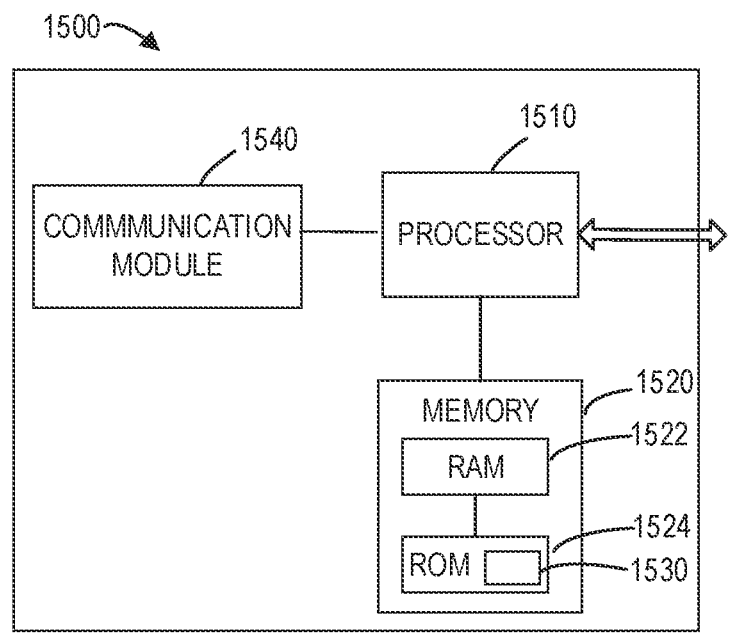
FIG. 15 is a simplified block diagram of a device 1500 that is suitable for implementing embodiments of the present disclosure.

FIG. 15 is a simplified block diagram of a device 1500 that is suitable for implementing embodiments of the present disclosure. The device 1500 may be provided to implement the communication device, for example the terminal device 110 as shown in FIG. 1. As shown, the device 1500 includes one or more processors 1510, one or more memories 1540 coupled to the processor 1510, and one or more transmitters and/or receivers (TX/RX) 1540 may be coupled to the processor 1510.

The TX/RX 1540 is for bidirectional communications. The TX/RX 61540 may have at least one antenna to facilitate communication. The communication interface may represent any interface that is necessary for communication with other network elements.

The processor 1510 may be of any type suitable to the local technical network and may include one or more of the following: general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

The memory 1520 may include one or more non-volatile memories and one or more volatile memories. Examples of the non-volatile memories include, but are not limited to, a read only memory (ROM) 1524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1522 and other volatile memories that will not last in the power-down duration.

A computer program 1530 may include computer executable instructions that are executed by the associated processor 1510. The program 1530 may be stored in the ROM 1524. The processor 1510 may perform any suitable actions and processing by loading the program 1530 into the RAM 1522.

The embodiments of the present disclosure may be implemented by means of the program so that the device 1500 may perform any process of the disclosure as discussed with reference to FIGS. 2 to 14. The embodiments of the present disclosure may also be implemented by hardware or by a combination of software and hardware.

Figure 16:
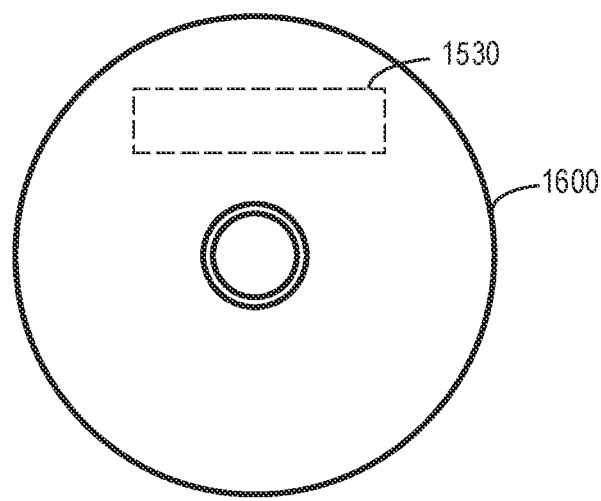
FIG. 16 shows an example of the computer readable medium 1600 in form of CD or DVD.

In some embodiments, the program 1530 may be tangibly contained in a computer readable medium which may be included in the device 1500 (such as in the memory 1520) or other storage devices that are accessible by the device 1500. The device 1500 may load the program 630 from the computer readable medium to the RAM 1522 for execution. The computer readable medium may include any types of tangible non-volatile storage, such as ROM, EPROM, a flash memory, a hard disk, CD, DVD, and the like. FIG. 16 shows an example of the computer readable medium 1600 in form of CD or DVD. The computer readable medium has the program 1530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out process 200, the method 1300 or 1400 as described above with reference to FIGS. 2 to 14. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
    at least one processor; and
    at least one memory including computer program codes, wherein the at least one memory and the computer program codes are configured to, with the at least one processor, cause the terminal device to:
        obtain model configuration information, wherein the model configuration information indicates a first prediction model for channel prediction;
        receive overfitting configuration information from a network device, wherein the overfitting configuration information indicates configuration on reference signals for overfitting the first prediction model; and
        report, to the network device, channel information predicted based on the first prediction model and the overfitting configuration information.

2. The terminal device of claim 1, wherein the overfitting configuration information comprises one or more of:
    configuration of channel information reference signals for overfitting the first prediction model;
    a time duration for overfitting the first prediction model;
    a start point for overfitting the first prediction model;
    configuration of bandwidth or bandwidth part for overfitting the first prediction model; or
    configuration of component carriers for overfitting the first prediction model,
    wherein model configuration information is obtained from the network device.

3. The terminal device of claim 1, wherein the terminal device is configured to:
    re-train the first prediction model based on the overfitting configuration information; and
    obtain the channel information by performing channel prediction based on the re-trained first prediction model.

4. The terminal device of claim 3, wherein the terminal device is caused to re-train the first prediction model by:
    collecting a first set of channel measurements on the reference signals for a time duration as indicated by the overfitting configuration information; and
    re-training the first prediction model based on the first set of channel measurements.

5. The terminal device of claim 1, wherein the terminal device is further caused to:
    collect a second set of channel measurements for a first time duration; and
    predict channel information using the first prediction model or a re-trained first model for a second time duration which is after the first time duration, based on the second set of channel measurement.

6. The terminal device of claim 1, wherein the terminal device is further caused to:
    transmit to the network device an overfitting request for the first prediction model to re-train the first prediction model; and
    receive an overfitting indication for the first prediction model from the network device, and wherein the overfitting indication indicates the terminal device to re-train the first prediction model.

7. The terminal device of claim 6, wherein the overfitting request comprises overfitting information, and wherein the overfitting information comprises one or more of:
    information on a location of the terminal device,
    information on the closeness value, or
    information on a difference of channel information predicted using the first prediction model and corresponding measured channel information.

8. The terminal device of claim 6, wherein the overfitting request further comprises a requested time duration for overfitting the first prediction model, and wherein the terminal device is further caused to:
    determine the time duration as indicated by the overfitting configuration information is less than the requested time duration; and
    re-train the first prediction model in a number of iterations greater than that corresponding to the time duration as indicated by the overfitting configuration information.

9. The terminal device of claim 1, wherein the terminal device is further caused to:

obtain a difference of channel information predicted using the first prediction model and corresponding measured channel information;

transmit to the network device an overfitting request for the first prediction model based on the obtained difference and a predetermined threshold; or transmit to the network device information on the obtained difference.

10. The terminal device of claim 1, wherein the model configuration information further indicates a second inference model for obtaining a closeness value of the first prediction model, and wherein the closeness value indicates prediction accuracy level of the first prediction model.

11. The terminal device of claim 10, wherein the terminal device is further caused to:

obtain, by using the second inference model, the closeness value based on corresponding measured channel information;

wherein the terminal device is further caused to:

transmit to the network device an overfitting request for overfitting the first prediction model based on the closeness value and another predetermined threshold; or transmit to the network device information on the closeness value, wherein the closeness value is obtained, by using the second inference model, further based on the channel information predicted using the first prediction model.

12. The terminal device of claim 11, wherein the closeness value is obtained further based on history closeness information and reference signal characteristics.

13. A network device, comprising:

at least one processor; and at least one memory including computer program codes, wherein the at least one memory and the computer program codes are configured to, with the at least one processor, cause the terminal device to:

transmit overfitting configuration information to a terminal device, wherein the overfitting configuration information indicates configuration on reference signals for overfitting a first prediction model; and receive, from the terminal device, channel information predicted based on the first prediction model and the overfitting configuration information.

14. The network device of claim 13, the network device is further caused to:

transmit model configuration information to the terminal device, wherein the model configuration information indicates the first prediction model for channel prediction.

15. The network device of claim 13, wherein the overfitting configuration information comprises one or more of:

configuration of channel information reference signals for overfitting the first prediction model;

a time duration for overfitting the first prediction model;

a start point for overfitting the first prediction model;

configuration of bandwidth or bandwidth part for overfitting the first prediction model; or configuration of component carriers for overfitting the first prediction model.

16. The network device of claim 13, wherein the network device is further caused to:

transmit the reference signals for overfitting the first prediction model to the terminal device based on the overfitting configuration information.

17. The network device of claim 13, wherein the model configuration information further indicates a second inference model for obtaining a closeness value of the first prediction model, and wherein the closeness value indicates prediction accuracy level of the first prediction model.

18. The network device of claim 13, wherein the network device is further caused to:

transmit an overfitting indication, wherein the overfitting indication informs the terminal device an opportunity for re-training the first prediction model, wherein the overfitting configuration information is transmitted after the overfitting indication is transmitted.

19. The network device of any of claim 13, wherein the network device is further caused to:

receive, from a terminal device, an overfitting request for the first prediction model to re-train the first prediction model, and wherein the overfitting configuration information is transmitted in response to receiving the overfitting request; and wherein the overfitting request comprises overfitting information, and wherein the overfitting information comprises one or more of:

information on a difference of channel information predicted using the first prediction model and corresponding measured channel information;

a closeness value of the first prediction model; or information on a location of the terminal device.

20. A method at a terminal device, comprising:

obtaining model configuration information, wherein the model configuration information indicates a first prediction model for channel prediction;

receiving overfitting configuration information from a network device, wherein the overfitting configuration information indicates configuration on reference signals for overfitting the first prediction model; and reporting, to the network device, channel information predicted based on the first prediction model and the overfitting configuration information.

* * * * *